(12) United States Patent
Ye et al.

(10) Patent No.: US 10,568,049 B2
(45) Date of Patent: Feb. 18, 2020

(54) DISTINGUISHING SUBFRAMES IN A DOWNLINK TRANSMISSION BURST

(71) Applicant: Intel IP Corporation, Santa Clara, CA (US)

(72) Inventors: Qiaoyang Ye, Fremont, CA (US); Hwan-Joon Kwon, Santa Clara, CA (US); Hong He, Sunnyvale, CA (US); Abhijeet Bhorkar, Fremont, CA (US); Jeon Jeongho, San Jose, CA (US)

(*) Notice: Subject to any disclaimer, the term of this patent is extended or adjusted under 35 U.S.C. 154(b) by 6 days.

(21) Appl. No.: 15/764,301

(22) PCT Filed: Mar. 29, 2016

(86) PCT No.: PCT/US2016/024800
§ 371 (c)(1),
(2) Date: Mar. 28, 2018

(87) PCT Pub. No.: WO2017/074493
PCT Pub. Date: May 4, 2017

(65) Prior Publication Data
US 2018/0288715 A1    Oct. 4, 2018

Related U.S. Application Data

(60) Provisional application No. 62/246,454, filed on Oct. 26, 2015.

(51) Int. Cl.
*H04W 52/14* (2009.01)
*H04W 52/36* (2009.01)
(Continued)

(52) U.S. Cl.
CPC ........ *H04W 52/325* (2013.01); *H04B 17/318* (2015.01); *H04L 5/0048* (2013.01);
(Continued)

(58) Field of Classification Search
CPC combination set(s) only.
See application file for complete search history.

(56) References Cited

U.S. PATENT DOCUMENTS

2014/0086166 A1* 3/2014 Lindbom .............. H04L 5/005
370/329
2015/0215929 A1* 7/2015 Damnjanovic ......... H04L 5/001
370/241

(Continued)

OTHER PUBLICATIONS

3GPP TS 36.321 V12.7.0; Evolved Universal Terrestrial Radio Access (E-UTRA); Medium Access Control (MAC) protocol specification; (Release 12); Valbonne—France; (Sep. 2015).

(Continued)

*Primary Examiner* — Ganiyu A Hanidu

(57) ABSTRACT

Technology for a user equipment (UE) operable to perform channel state information (CSI) measurements in a License Assisted Access (LAA) system is disclosed. The UE can process information received from a base station in the LAA system. The information can be received within a downlink (DL) transmission burst from the base station. The information can indicate one of: a cell-specific reference signal (CRS) or channel state information reference signal (CSI-RS) transmission power offset value for the DL transmission burst, one or more subframes in the DL transmission burst for which the UE is to perform CSI measurements, or a subframe boundary of the DL transmission burst. The UE can perform a CSI measurement for the DL transmission burst based on the information received from the base station. Subframes of the DL transmission burst can be associated with a substantially similar transmission power.

22 Claims, 21 Drawing Sheets

(51) Int. Cl.
    *H04B 17/318* (2015.01)
    *H04L 5/00* (2006.01)
    *H04W 52/32* (2009.01)
    *H04B 7/06* (2006.01)
(52) U.S. Cl.
    CPC ......... *H04W 52/143* (2013.01); *H04W 52/36* (2013.01); *H04B 7/0626* (2013.01)

(56) References Cited

U.S. PATENT DOCUMENTS

| | | | | |
|---|---|---|---|---|
| 2016/0227519 | A1* | 8/2016 | Nimbalker | H04L 5/0094 |
| 2017/0311320 | A1* | 10/2017 | Lunttila | H04L 5/001 |
| 2017/0318607 | A1* | 11/2017 | Tiirola | H04W 72/0446 |
| 2017/0347270 | A1* | 11/2017 | Iouchi | H04W 16/14 |
| 2018/0279144 | A1* | 9/2018 | Mukherjee | H04B 7/0626 |
| 2019/0150170 | A1* | 5/2019 | Park | H04W 72/1268 |

OTHER PUBLICATIONS

3GPP TS 36.211 V12.7.0; Evolved Universal Terrestrial Radio Access (E-UTRA); Physical channels and modulation; (Release 12); Valbonne—France; (Sep. 2015).
3GPP TSG RAN WG1 Meeting #82bis (R1-156386); RAN1 Agreements and Working Assumptions for Rel-13 LAA (Revision of R1-156379); Agenda Item 7.23; Source: WI rapporteur (Ericsson, Huawei); Malmo Sweden; Oct. 5-9, 2015.
3GPP TSG RAN WG1 Meeting #83 (R1-156516); On the LAA DL Signalling; Agenda Item: 6.2.3.3; Source: Intel Corporation; Anaheim, U.S.; Nov. 15-22, 2015.

* cited by examiner

DISTINGUISHING SUBFRAMES IN A DOWNLINK TRANSMISSION BURST

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 902.16 standard (e.g., 902.16e, 902.16m), which is commonly known to industry groups as WiMAX (Worldwide interoperability for Microwave Access), and the IEEE 902.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
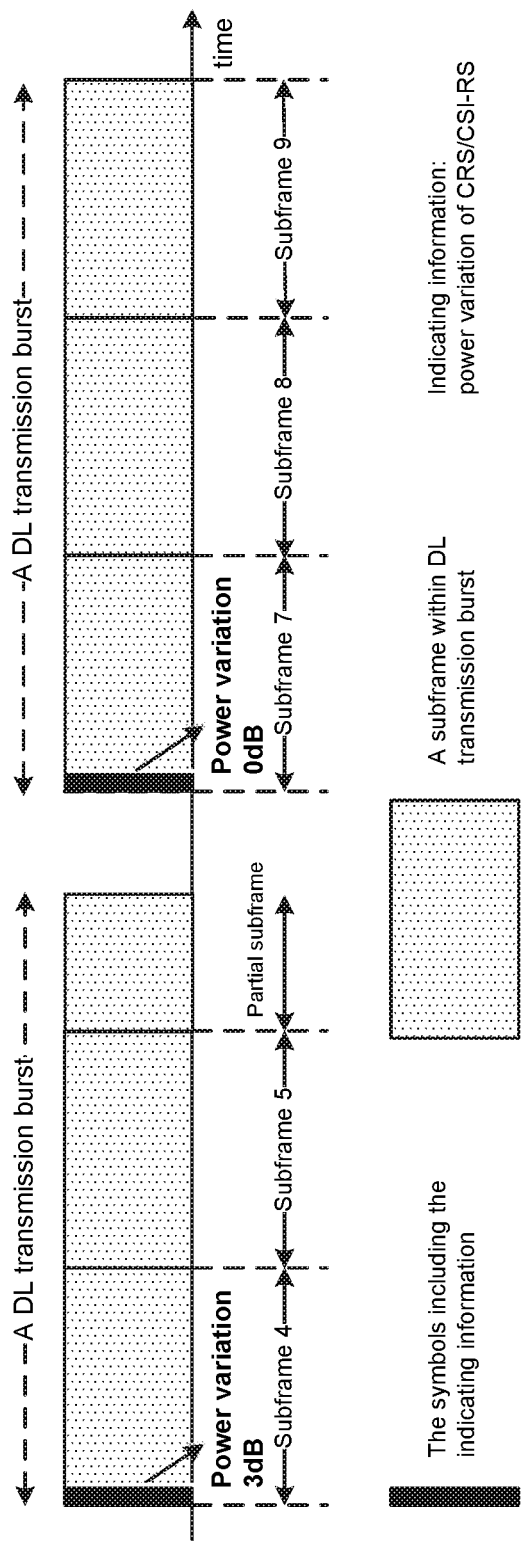
FIG. 1A illustrates a technique for indicating a cell-specific reference signal (CRS) or channel state information reference signal (CSI-RS) transmission power difference in a starting subframe of a downlink (DL) transmission burst in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The conventional 3GPP LTE system utilizes spectrum that is exclusively assigned to corresponding LTE service providers (or operators), and this spectrum is referred to as LTE in Licensed Spectrum (or simply LTE). However, due to an upsurge in demand for wireless broadband data, increasing the data throughput in the 3GPP LTE system is desirable. In one solution, data can be transmitted through an unlicensed spectrum in addition to the licensed spectrum. The 3GPP Release 13 LTE system operating in the unlicensed spectrum can be referred to as LTE in Unlicensed Spectrum (or LTE-U). A system integrating LTE and LTE-U using carrier aggregation (CA) technology is referred to as Licensed-Assisted Access (LAA) using LTE, or simply LAA. In LAA, an LTE licensed carrier serves as a primary cell (PCell) and one or multiple LTE-U carriers serve as secondary cell(s) or SCell(s). In other words, the LTE-U carriers are used as secondary cells to offload the data in LTE as part of carrier aggregation. In contrast to LTE, LTE-U shares the medium (or spectrum) with other radio access technologies (RATs), such as IEEE 802.11x (WiFi) or the same RAT (i.e., LTE-U) deployed by other operators.

The unlicensed frequency band of current interest for LAA systems is the 5 GHz band, which has wide spectrum with global common availability. The 5 GHz band in the United States is governed by Unlicensed National Information Infrastructure (U-NII) rules by the Federal Communications Commission (FCC). The main incumbent system in the 5 GHz band is the Wireless Local Area Networks (WLAN), specifically those based on the IEEE 802.11 a/n/ac technologies. Since WLAN systems are widely deployed both by individuals and operators for carrier-grade access service and data offloading, sufficient care is to be taken before the deployment. Therefore, Listen-Before-Talk (LBT) is a mandatory feature of the 3GPP Release 13 LAA system for fair coexistence with the incumbent system. LBT is a procedure in which radio transmitters can (1) detected a medium and (2) transmit only if the medium is detected to be idle. A maximum allowed channel occupancy time is defined by regulations, e.g., 4 ms in Japan, over which a transmission may continue without performing additional LBT. In other words, a transmitter may release the unlicensed channel before the expiration of the maximum occupancy time, which leads to discontinuous transmissions. When the transmissions are continuous, the transmissions can be referred to as a transmission burst.

In one configuration, multiple-input multiple-output (MIMO) techniques rely on channel state information (CSI) knowledge. To acquire CSI, cell-specific reference signals (CRS) were introduced in 3GPP LTE Release 8 to enable CSI measurements at a user equipment (UE). In 3GPP LTE Release 10, CSI reference signals (CSI-RS) were further introduced to enable CSI measurements at the UE for up to 8 transmission antenna ports and for multiple cells rather than a single serving cell of the UE, which support multi-cell cooperative transmissions.

Similar to the legacy LTE system, CRS and CSI-RS are used to perform CSI measurements in LAA systems. In LAA systems, the UE can assume that the CRS and CSI-RS transmissions have a constant power in each subframe of a downlink (DL) transmission burst. As previously described a DL transmission burst is a continuous transmission. In addition, the UE cannot assume that CRS and CSI-RS transmission powers are the same across transmission bursts.

Based on the UE assumptions described above, potential issues can arise with the CSI measurements performed at the UE due to mismatches in the UE's measured subframe and an eNodeB's understanding of the measured subframe. For example, an LAA system can comprise of subframe #2 belonging to a DL transmission burst and subframe #3 belonging to another DL transmission burst, wherein the transmission power of CRS and CSI-RS in subframes #2 and #3 are different. If a Channel Quality Indicator (CQI) report for subframe #2 is missed, e.g., when a physical downlink control channel (PDCCH) in subframe #2 has not been correctly detected by the UE, the eNodeB may mistakenly determine a subframe index corresponding to the received CQI report. In other words, the eNodeB may not be able to distinguish if the received CQI report, which is estimated by the UE in subframe #3, is based on the CRS/CSI-RS transmitted in subframe #2 or subframe #3. As the transmission power of the CRS/CSI-RS is different for these two subframes, the eNodeB can end up with incorrect CSI knowledge.

To address the issues above, the present technology describes a number of techniques that enables the UE to accurately perform CSI measurements when the CRS/CSI-RS have different transmission powers across different DL transmission bursts. In a first configuration, the UE can perform CSI measurements based on an indication of a power difference between a transmit power used for a current CRS/CSI-RS transmission and a reference value. In a second configuration, the UE can perform CSI measurements based on an identification of subframes for which CSI measurements are to be performed. In a third configuration, the UE can perform CSI measurements based on an identification of a DL transmission burst.

In the first configuration, the UE can distinguish CSI measurements from CRS/CSI-RS with different transmission powers based on an indication of a power difference between a CRS/CSI-RS transmission power in a DL transmission burst and a reference CRS/CSI-RS power. In this configuration, the power difference between CRS/CSI-RS transmission power in the DL transmission burst and the reference CRS/CSI-RS transmission power can be explicitly indicated from the eNodeB to the UE. In one example, the indication information can be transmitted in a subset of subframes within the DL transmission burst, e.g., only in the starting subframe of the DL transmission burst. In another example, the indication information can be transmitted in every subframe within the DL transmission burst.

In the second configuration, the UE can distinguish CSI measurements from CRS/CSI-RS with different transmission powers based on an identification of subframes for which the UE is to perform CSI measurements. In this configuration, the eNodeB can indicate to the UE the subframes for which the UE is to perform CSI measurements and report CQI.

In one example, the eNodeB can explicitly indicate the subframe indexes for which the UE is to perform the CSI measurements. The subframe indexes can be transmitted in a subset of subframes within the DL transmission burst, e.g., in a starting subframe of each radio frame within the DL transmission burst. Alternatively, the indexes of subframes can be transmitted in every subframe within the DL transmission burst.

In one example, the eNodeB can explicitly indicate the total number of subframes for which the UE is to not perform CSI measurements after each subframe for which the UE is to perform CSI measurements. The indication information can be given in each subframe for which the UE is to perform the CSI measurement. Alternatively, the indication information can be given in a subset of subframes, e.g., in a first subframe for which the UE does not perform the CSI measurement following a subframe for which the UE does perform the CSI measurement.

In one example, the eNodeB can explicitly indicate the number of remaining subframes for which the UE is to not perform CSI measurements. The number of remaining subframes can be transmitted in a subset of subframes within the DL transmission burst, e.g., in every other subframe in the DL transmission burst. Alternatively, the number of remaining subframes can be transmitted in every subframe within the DL transmission burst.

In one example, the eNodeB can indicate the subframes for which the UE is to perform CSI measurements with a 1-bit indicator. As an example, 1-bit information can be transmitted in every subframe to indicate whether the UE is to perform CSI measurements on that subframe. As another example, the subframes within each radio frame for which the UE is to perform CSI measurements can be fixed or semi-statically configured (e.g. via RRC signaling), and the 1-bit information can be transmitted in each radio frame to indicate whether or not the UE is to perform CSI measurements for the subframes in the radio frame within the DL transmission burst. In yet another example, the subframes within each DL burst (indexed from the starting of the DL burst) for which the UE is to perform CSI measurements can be fixed or semi-statically configured (e.g. via RRC signaling), and 1-bit information can be transmitted in each DL burst to indicate whether or not the UE is to perform CSI measurements for the subframes within the DL transmission burst.

In the third configuration, the UE can distinguish CSI measurements from CRS/CSI-RS with different transmission powers based on an identification of the DL transmission burst. In other words, the eNodeB can enable the UE to identify whether or not subframes belong to a same transmission burst.

In one example, the eNodeB can indicate a starting and/or ending position of the DL transmission burst. An indicator can function to differentiate the starting and/or ending subframe from other subframes. The indication information can be transmitted in a subset of subframes, e.g., only in the starting subframe of the DL transmission burst for indicating the starting subframe, or only in the last subframe of the DL transmission burst for indicating the ending subframe. Alternatively, the indication information can be transmitted in every subframe within the DL transmission burst, e.g., '1' for starting (ending) subframe of the DL transmission burst, and '0' for subframes other than the starting (ending) subframe.

In one example, toggling information can be used to indicate if the subframes belong to the same DL transmission burst. For example, toggling information can be transmitted in a subset of the subframes within the DL transmission burst, e.g., in the first subframe of each DL transmission burst. Alternatively, the toggling information can be transmitted in every subframe within the DL transmission burst. In one example, the toggling information can have multiple bits, e.g., 2 bits, which can be used to differentiate four consecutive transmission bursts. The length of toggling bits can be fixed or semi-statically configured (e.g. via RRC signaling).

In one example, the eNodeB can explicitly indicate the total number of subframes within each DL transmission burst. For example, the total number of subframes within the DL transmission burst can be indicated in a subset of subframes within the DL transmission burst, e.g., only in the first subframe. Alternatively, the total number of subframes within the DL transmission burst can be indicated in every subframe of the DL transmission burst.

In one example, the eNodeB can explicitly indicate the number of remaining subframes within the DL transmission burst. For example, the number of remaining subframes within the DL transmission burst can be indicated in a subset of subframes within the DL transmission burst, e.g., in every other subframes. Alternatively, the number of remaining subframes within the DL transmission burst can be indicated in every subframe within the DL transmission burst.

In one configuration, the UE can receive the indication information from the eNodeB using one of: downlink control information (DCI), a Physical Control Format Indicator Channel (PCFICH) or a CRS, and the information can enable the UE to distinguish subframes with different transmission powers when performing CSI measurements. With respect to a DCI based technique, a new DCI format can be achieved by modifying an existing DL DCI. In one example, DCI format 1C can be modified by: (1) re-using an available payload (e.g., 12 bits without padding for 5 MHz systems) to carry the indication information and (2) scrambling cyclic redundancy check (CRC) parity bits with a newly defined Radio Network Temporary Identifier (RNTI), referred to as an LAA RNTI, to indicate the new DCI. In another example, a search space for the new DCI format can be either a common search space, or a UE-group search space. In yet another example, additional fields for carrying the indication information can be added to the existing DL DCI, and the CRC in this new DCI can be scrambled by the LAA-RNTI. With respect to a PCFICH based technique, a number of physical downlink control channel (PDCCH) sizes can be limited to no more than two choices, which results in available bits in the PCFICH to carry the indication information. With respect to a CRS based technique, new CRS sequences can be designed to carry the indication information. For example, by modifying an initial value of a pseudo-random sequence generator for CRS generation, indication information can be included in the CRS. Furthermore, by introducing a phase modulation of the CRS, additional indication information can be carried by the phase rotated CRS. In addition, the existing CRS can be extended to {CRS, −CRS}, which can provide additional 1-bit information.

Figure 1B:
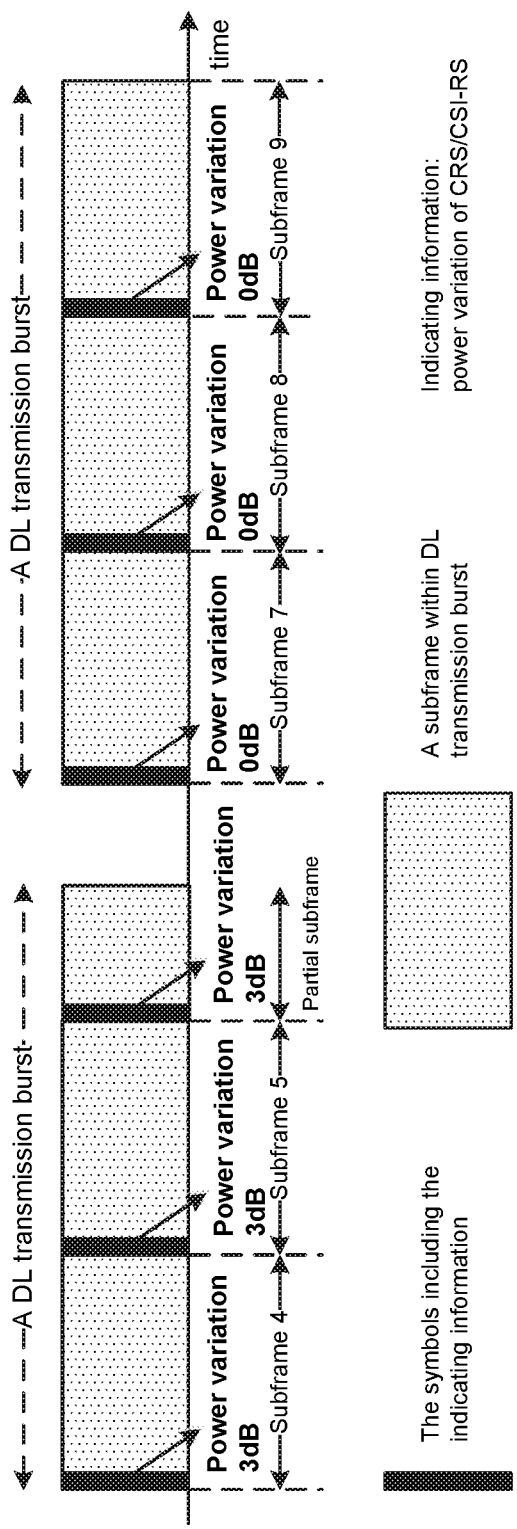
FIG. 1B illustrates a technique for indicating a CRS CSI-RS transmission power difference in every subframe of a downlink (DL) transmission burst in accordance with an example.

FIGS. 1A-1B illustrate a user equipment (UE) distinguishing CSI measurements from CRS/CSI-RS with different transmission powers based on an indication of a power difference between a CRS/CSI-RS transmission power in a DL transmission burst and a reference CRS/CSI-RS power. The indication information can be transmitted from an eNodeB to the UE. The eNodeB can determine a downlink transmit energy per resource element (EPRE). The ratio of CRS/CSI-RS EPRE in a DL transmission burst to a reference CRS/CSI-RS EPRE can be explicitly indicated from the eNodeB to the UE. More specifically, a UE can assume that the downlink CRS/CSI-RS EPRE is constant across a downlink system bandwidth and constant across all subframes within an LAA transmission burst. In order to minimize the DL control signaling overhead, the possible candidates of power ratio can be limited.

FIG. 1A illustrates an exemplary technique for indicating a cell-specific reference signal (CRS) or channel state information reference signal (CSI-RS) transmission power difference in a starting subframe of a downlink (DL) transmission burst. As shown in FIG. 1A, indication information can be transmitted in a subset of subframes within a DL transmission burst, e.g., only in a first subframe of the DL transmission burst. As non-limiting examples, the indication information can include a power variation of 3 decibels (dB) in subframe 4 and a power variation of 0 dB in subframe 7. The power variation indicates the power difference between the CRS/CSI-RS transmission power in the DL transmission burst and the reference CRS/CSI-RS power.

FIG. 1B illustrates an exemplary technique for indicating a CRS CSI-RS transmission power difference in every subframe of a downlink (DL) transmission burst. As shown in FIG. 1B, indication information can be transmitted in every subframe within the DL transmission burst. As non-limiting examples, the indication information can include a power variation of 3 dB in subframes 4, 5 and 6, and the indication information can include a power variation of 0 dB in subframes 7, 8 and 9.

In one example, the subframes within a DL transmission burst in which the UE monitors the information of power ratio can be configured by higher layers, considering a trade-off between DL control signaling overhead and reliability. In addition, if the UE does not detect valid power ratio information in the configured subframes, the UE can assume a predefined ratio value (e.g., 0 dB power ratio) for CRS/CSI-RS EPRE in the given DL transmission burst.

FIGS. 2A-2F illustrate a user equipment (UE) distinguishing CSI measurements from CRS/CSI-RS with different transmission powers based on an identification of subframes for which the UE is to perform CSI measurements. Therefore, an eNodeB can indicate subframe(s) for which a user equipment (UE) is to perform CSI measurements and report CQI.

Figure 2A:
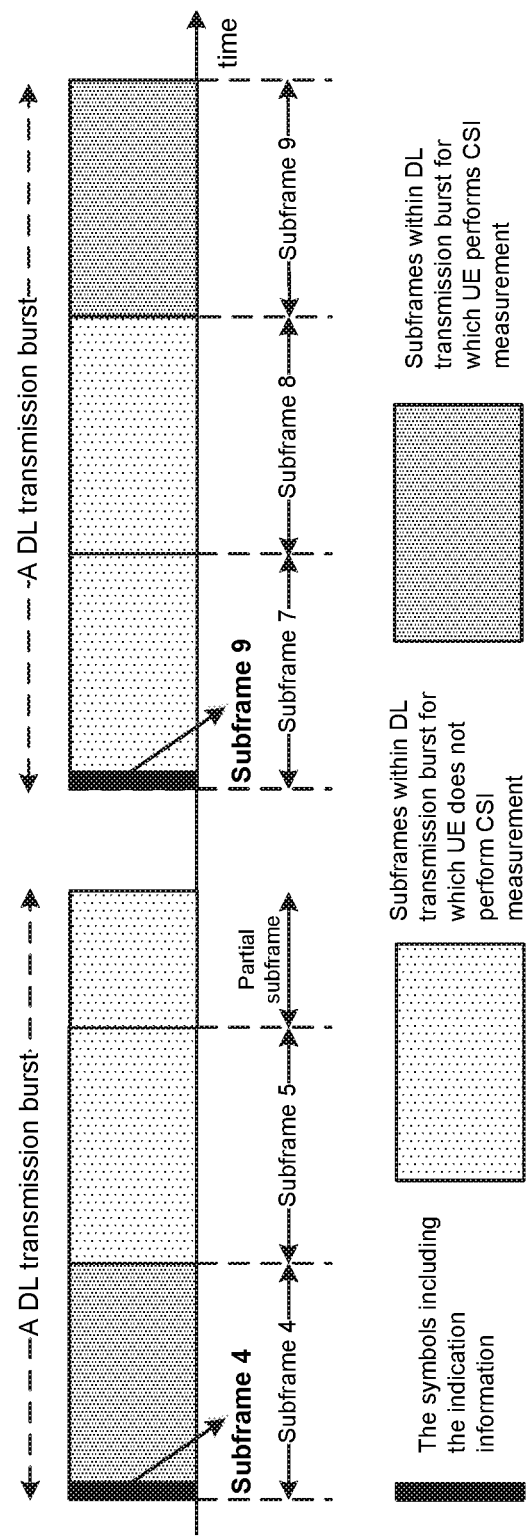
FIG. 2A illustrates a technique for indicating subframe indexes for which a user equipment (UE) is to perform CSI measurements in accordance with an example.

FIG. 2A illustrates an exemplary technique for indicating subframe indexes for which a user equipment (UE) is to perform CSI measurements. The index of subframe(s) for which the UE is to perform CSI measurements can be indicated explicitly from an eNodeB to the UE. In one example, the eNodeB can signal the indexes of subframe(s) that can be used by the UE to perform the CSI measurements in a subset of subframes within a DL transmission burst, e.g., in the starting subframe within the DL transmission burst. In another example, one or more subframes within a DL transmission burst can be signaled to the UE in every subframe within the DL transmission burst, and the UE can perform CSI measurements for the one or more subframes. As a non-limiting example, the eNodeB can send indication information in subframe 4 to indicate that the UE is to perform CSI measurements for subframe 4. As another non-limiting example, the UE can send indication information in subframe 7 to indicate that the UE is to perform CSI measurements for subframe 9.

Figure 2B:
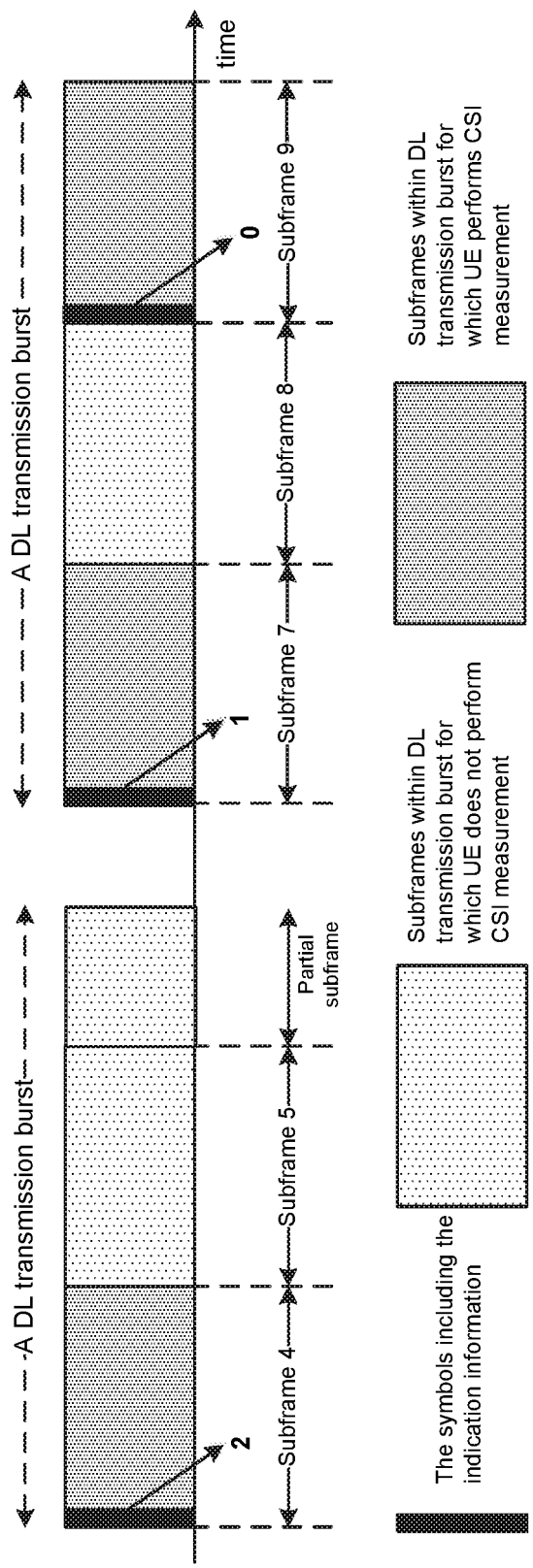
FIG. 2B illustrates a technique for indicating a number of subframes for which a user equipment (UE) is to not perform CSI measurements after an indicated subframe in accordance with an example.

FIG. 2B illustrates an exemplary technique for indicating a number of subframes for which a user equipment (UE) is to not perform CSI measurements after an indicated subframe. An eNodeB can explicitly indicate the total number of subframes for which the UE does not perform CSI measurements, and the indication can be sent after each subframe that involves CSI measurements at the UE. In one example, this indication information can be given in each subframe that involves CSI measurements at the UE. As a non-limiting example, the eNodeB can send indication information in subframe 4 (a subframe for which the UE performs CSI measurements) indicating that the UE is to not perform CSI measurements for the next two subframes (i.e., subframes 5 and 6). As another non-limiting example, the eNodeB can send indication information in subframe 7 (a subframe for which the UE performs CSI measurements) indicating that the UE is to not perform CSI measurements for the next subframe (i.e., subframe 8). In the example shown in FIG. 2B, the UE performs CSI measurements for subframes 4, 7 and 9.

Figure 2C:
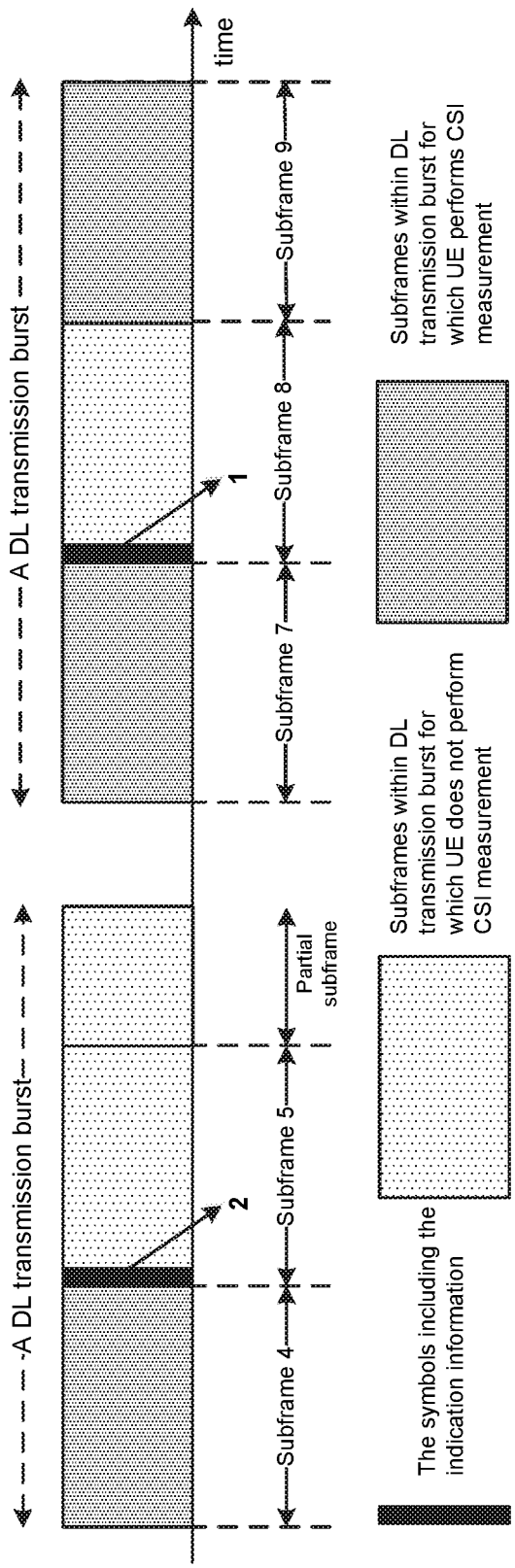
FIG. 2C illustrates a technique for indicating a total number of subframes for which a user equipment (UE) does not perform CSI measurements and indication information is included in a first subframe for which the UE does not perform CSI measurements and after a subframe for which the UE does perform CSI measurements in accordance with an example.

FIG. 2C illustrates an exemplary technique for indicating a total number of subframes for which a user equipment (UE) is to not perform CSI measurements and indication information is included in a first subframe for which the UE does not perform CSI measurements and after a subframe for which the UE does perform CSI measurements. An eNodeB can provide the indication information to the UE in a first subframe in which the UE does not perform CSI measurements, and the indication information can follow every subframe for which the UE does perform CSI measurements. As a non-limiting example, the eNodeB can send indication information in subframe 5 (which is after subframe 4 for which the UE performs CSI measurements), and the indication information can indicate that the UE is to not perform CSI measurements for the next two subframes (i.e., subframes 5 and 6). As another non-limiting example, the eNodeB can send indication information in subframe 8 (which is after subframe 7 for which the UE performs CSI measurements), and the indication information can indicate that the UE is to not perform CSI measurements for the next subframe (i.e., subframe 8).

Figure 2D:
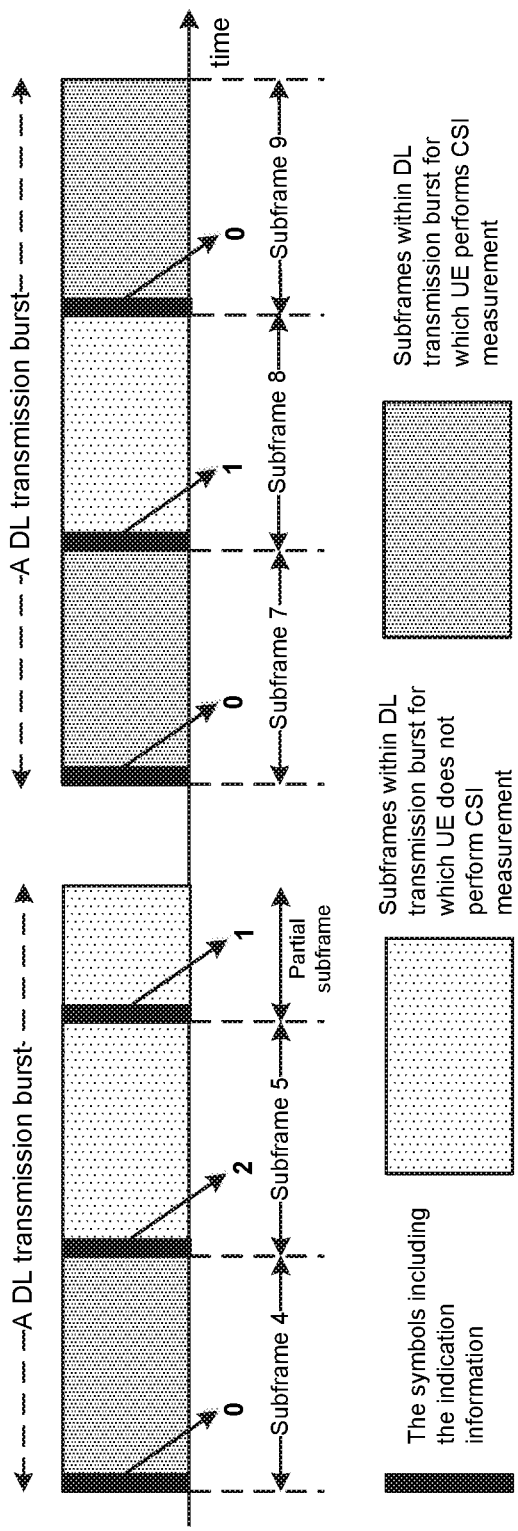
FIG. 2D illustrates a technique for indicating a number of remaining subframes for which a user equipment (UE) is to not perform CSI measurements after an indicated subframe in accordance with an example.

FIG. 2D illustrates an exemplary technique for indicating, after an indicated subframe, a number of remaining subframes for which a user equipment (UE) is to not perform CSI measurements. An eNodeB can explicitly indicate to a user equipment (UE) the number of remaining subframes for which the UE does not perform CSI measurements. In one example, this indication information can be transmitted in a subset of subframes, e.g., in every other subframe within the DL transmission burst. In another example, this indication information can be transmitted in every subframe. As a non-limiting example, the eNodeB can send indication information in subframe 4, and the indication information can indicate that there are 0 remaining subframes for which the UE does not perform CSI measurements. Therefore, the UE can perform CSI measurements for subframe 4. In other words, indication information with 0 indicates the subframes for which the UE is to perform CSI measurements. As another non-limiting example, the eNodeB can send indication information in subframe 5, and the indication information can indicate that there are 2 remaining subframes for which the UE does not perform CSI measurements. Therefore, the UE does not perform CSI measurements for subframes 5 and 6.

Figure 2E:
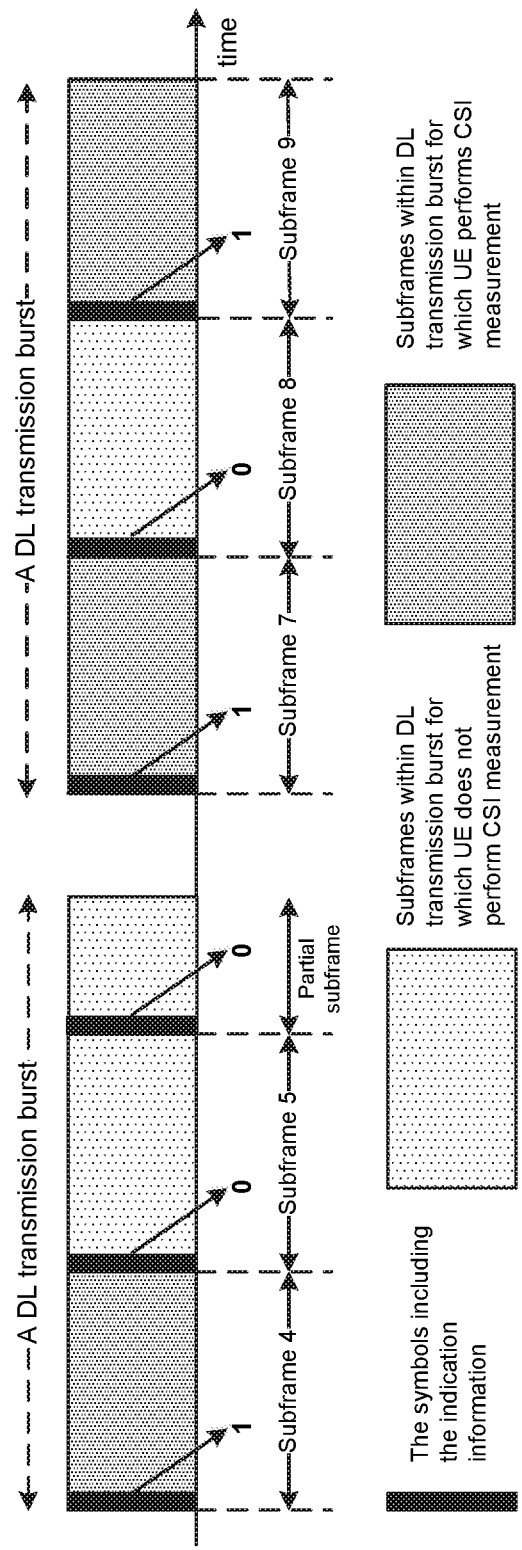
FIG. 2E illustrates a technique for indicating subframes for which a user equipment (UE) is to perform CSI measurements with 1-bit information at each subframe in accordance with an example.

FIG. 2E illustrates an exemplary technique for indicating subframes for which a user equipment (UE) is to perform CSI measurements with 1-bit information at each subframe. An eNodeB can indicate subframes for which the UE is to perform CSI measurements via 1-bit information. For example, 1-bit indication information can be transmitted in every subframe, where "1" can be transmitted in subframes for which the UE is to perform CSI measurements, and "0" can be transmitted in subframes for which the UE is to not perform CSI measurements (i.e., subframes for which the CSI measurements are skipped). As a non-limiting example, the eNodeB can transmit a "1" in subframe 4 to indicate that the UE is to perform CSI measurements for subframe 4. As another non-limiting example, the eNodeB can transmit a "0" in subframe 5 to indicate that the UE is to not perform CSI measurements for subframe 5.

In one example, the subframes within each radio frame for which the UE is to perform CSI measurements can be fixed in a specification or configured by higher layers, e.g., subframes 1, 3, 5, 7 and 9. In this case, 1-bit information can be signaled in each radio frame within the DL transmission burst to indicate whether or not the UE is to perform CSI measurements in these subframes within this radio frame or not, as shown in FIG. 2E.

Figure 2F:
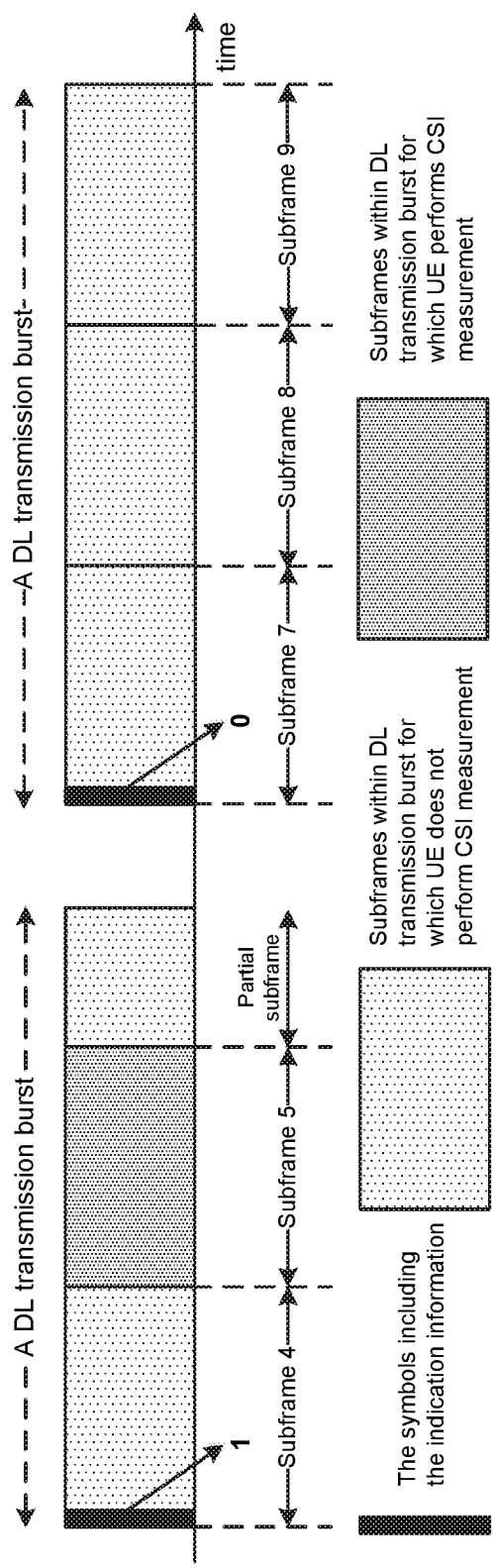
FIG. 2F illustrates a technique in which subframes within a radio frame for CSI measurements are fixed and 1-bit information at each radio frame is used to indicate that a user equipment (UE) is to perform CSI measurements in the fixed subframes in the radio frame in accordance with an example.

FIG. 2F illustrates an exemplary technique in which subframes within a radio frame for CSI measurements are fixed and 1-bit information at each radio frame is used to indicate that a user equipment (UE) is to perform CSI measurements in the fixed subframes in the radio frame. For example, the subframes within each DL transmission burst (indexed from the starting of the DL transmission burst) for which the UE is to perform CSI measurements can be fixed, and an eNodeB can transmit 1-bit information to the UE in each DL burst to indicate whether or not the UE is to perform CSI measurements for these subframes within the DL transmission burst. As a non-limiting example, the fixed subframes for which the UE is to perform CSI measurements can be {5, 7, 9}.

In one example, every other subframe within the DL transmission burst can be fixed (i.e., the UE is to perform CSI measurements for the subframes that are fixed). The eNodeB can transmit indication information at the start of each DL transmission burst, and indication information of "1" can indicate that the UE is to perform CSI measurements for odd subframes in the DL transmission burst, and indication information of "0" can indicate that the UE is to not perform CSI measurements for any subframes in the DL transmission burst.

FIGS. 3A-3F illustrate a user equipment (UE) distinguishing CSI measurements from CRS/CSI-RS with different transmission powers based on an identification of the DL transmission burst. In other words, the subframes with CRS/CSI-RS of different transmission power can be distinguished based on the identification of the DL transmission burst. Since the CRS/CSI-RS has the same transmission power within each DL transmission burst, the UE can identify whether or not the subframes belong to the same transmission burst based on indication information received from an eNodeB.

Figure 3A:
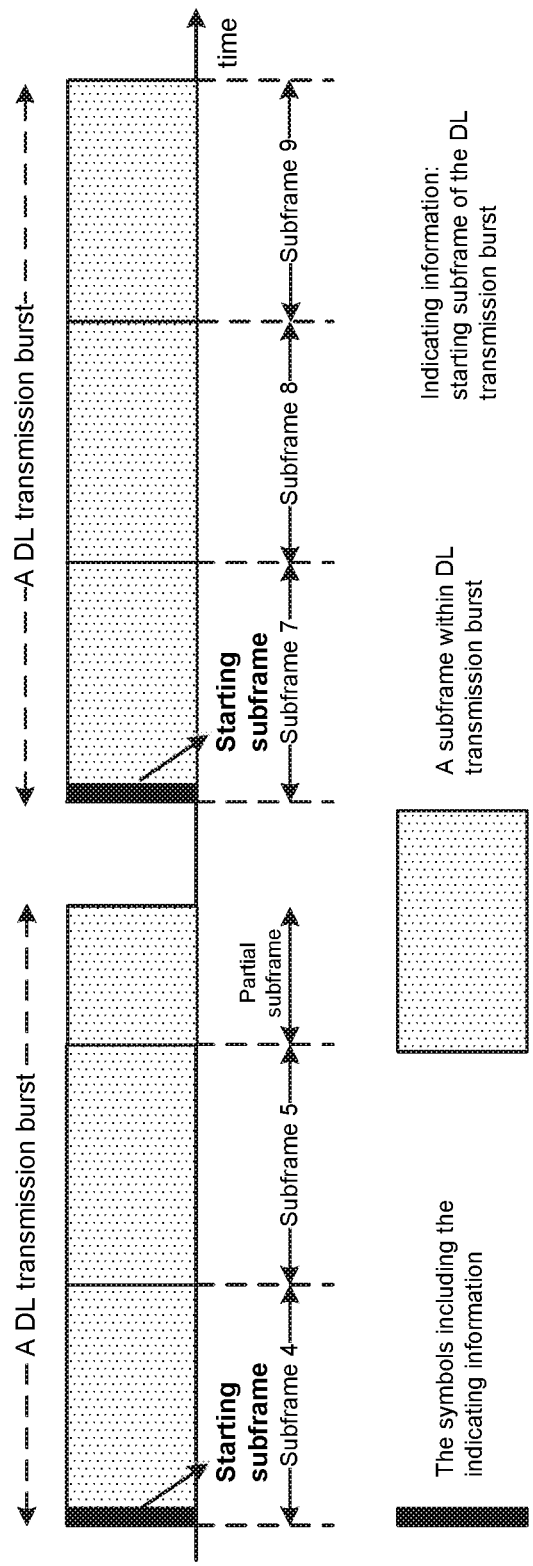
FIG. 3A illustrates a technique for indicating a starting subframe of each downlink (DL) transmission burst and indication information is transmitted in the starting subframe of the DL transmission burst in accordance with an example.

FIG. 3A illustrates an exemplary technique for indicating a starting subframe of each downlink (DL) transmission burst and indication information is transmitted in the starting subframe of the DL transmission burst. In one example, an eNodeB can transmit an indication of a starting and/or ending position of the DL transmission burst. The indicator can be used to differentiate the starting and/or ending subframe from other subframes. In one example, the indication information can be transmitted in a subset of subframes, e.g., only in the starting subframe of the DL transmission burst, or only in the last subframe of the DL transmission burst. In another example, the indication information can be used to indicate the ending subframe or both the starting and ending subframes of the DL transmission burst. As a non-limiting example, the eNodeB can transmit an indicator in subframe 4 to indicate that subframe 4 is a starting subframe in a DL transmission burst. As another non-limiting example, the eNodeB can transmit an indicator in subframe 7 to indicate that subframe 7 is a starting subframe in a DL transmission burst.

Figure 3B:
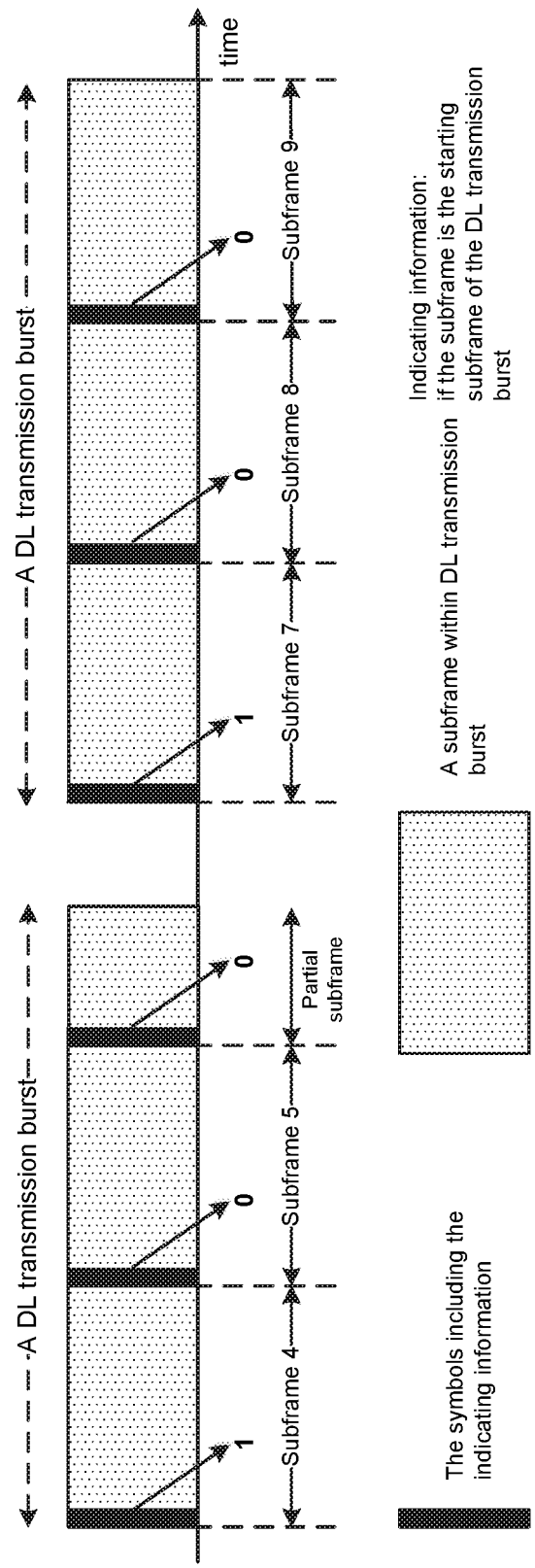
FIG. 3B illustrates a technique for indicating a starting subframe of each downlink (DL) transmission burst and indication information is transmitted in every subframe within the DL transmission burst in accordance with an example.

FIG. 3B illustrates an exemplary technique for indicating a starting subframe of each downlink (DL) transmission burst and indication information is transmitted in every subframe within the DL transmission burst. An eNodeB can transmit the indication information in every subframe within the DL transmission burst, e.g., 1 for starting (or ending) subframe of the DL transmission burst, and 0 for subframes other than the starting (or ending) subframe. In one example, the eNodeB can transmit the indication information to indicate the ending subframe or both the starting and ending subframes of the DL transmission burst. As a non-limiting example, in every subframe the eNodeB can transmit "1" to indicate a starting subframe of the DL transmission burst or the eNodeB can transmit "0" to indicate an ending subframe of the DL transmission burst.

Figure 3C:
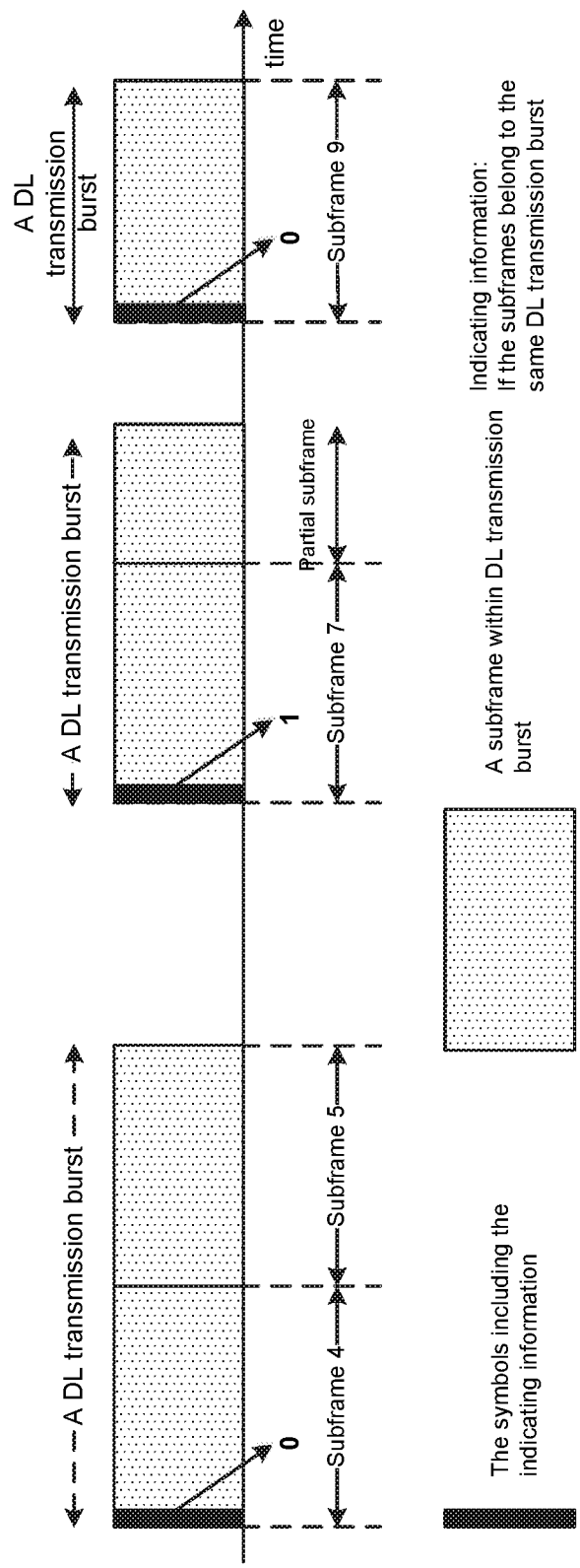
FIG. 3C illustrates a technique for using toggling information in every starting subframe of a downlink (DL) transmission burst to distinguish subframes belonging to different DL transmission bursts in accordance with an example.

FIG. 3C illustrates an exemplary technique for using toggling information in every starting subframe of a downlink (DL) transmission burst to distinguish subframes belonging to different DL transmission bursts. In one example, toggling information can indicate if the subframes belong to the same DL transmission burst, wherein the same toggling information is carried in subframes within the same transmission burst, and different toggling information is carried in subframes belonging to the neighboring transmission bursts. The number of bits used for the toggling information can be configurable. In one example, n-bit toggling information can be used, with $j \in \{0, 1, \ldots, (2^n-1)\}$ transmitted in subframes within the mth DL transmission burst, where $(m \bmod (2^n-1))=j$. The use of multiple bits can be more reliable as compared to using 1 bit for the toggling information, as the multiple bits can avoid confusion between two transmission bursts if a short transmission burst between these two bursts is missing.

In one example, toggling information can be transmitted in a subset of subframes within the DL transmission burst. For example, the toggling information can be transmitted only in the first subframe of each DL transmission burst, thereby indicating the starting position of each DL transmission burst. In another example, the toggling information can be transmitted in every other subframe within the burst. As a non-limiting example, the eNodeB can transmit toggling information of "0" to indicate a first subframe in a first DL transmission burst, the eNodeB can transmit toggling information of "1" to indicate a first subframe in a second DL transmission burst, and the eNodeB can transmit toggling information of "1" to indicate a first subframe in a third DL transmission burst.

Figure 3D:
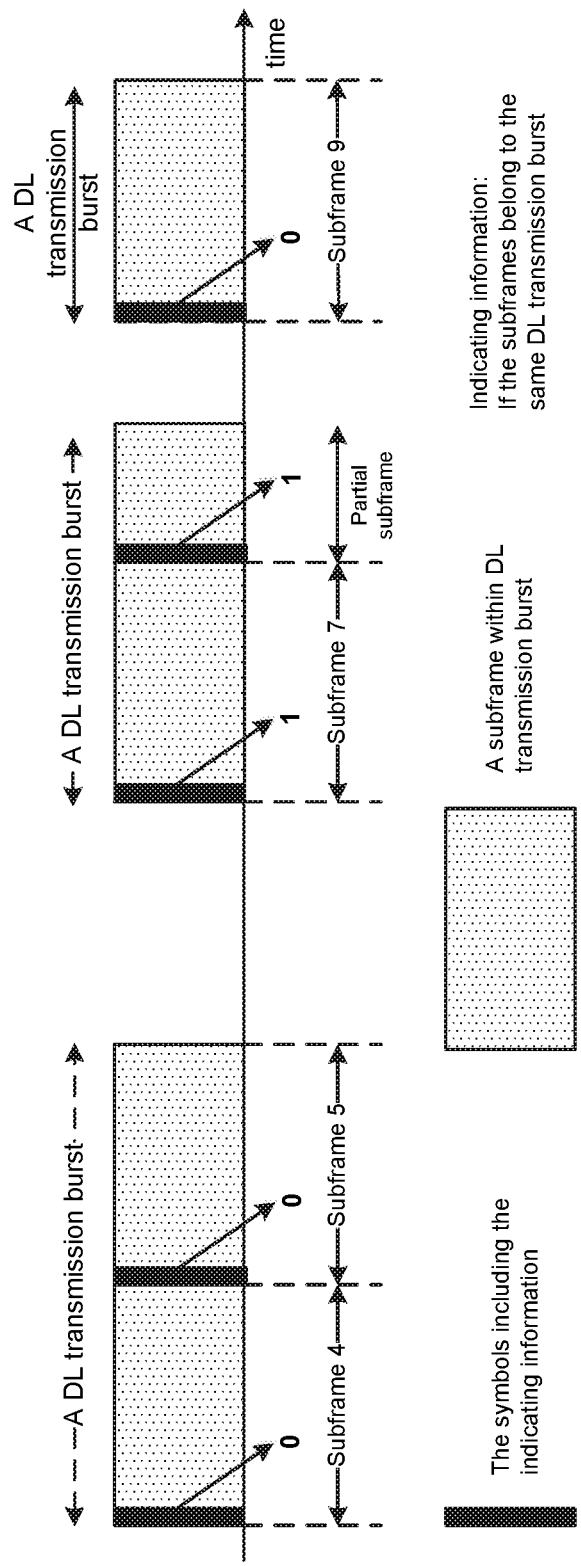
FIG. 3D illustrates a technique for using toggling information in every subframe of a downlink (DL) transmission burst to distinguish subframes belonging to different DL transmission bursts in accordance with an example.

FIG. 3D illustrates an exemplary technique for using toggling information in every subframe of a downlink (DL) transmission burst to distinguish subframes belonging to different DL transmission bursts. For example, an eNodeB can transmit to a user equipment (UE) the toggling information (e.g., 1-bit toggling information) in every subframe within the DL transmission burst. As a non-limiting example, the eNodeB can transmit toggling information of "0" in subframes 4 and 5, thereby indicating that subframes 4 and 5 belong to the same DL transmission burst. As another non-limiting example, the eNodeB can transmit toggling information of "1" in subframes 7 and 8, thereby indicating that subframes 7 and 8 belong to the same DL transmission burst. Based on the toggling information, the UE can distinguish between different DL transmission bursts.

Figure 3E:
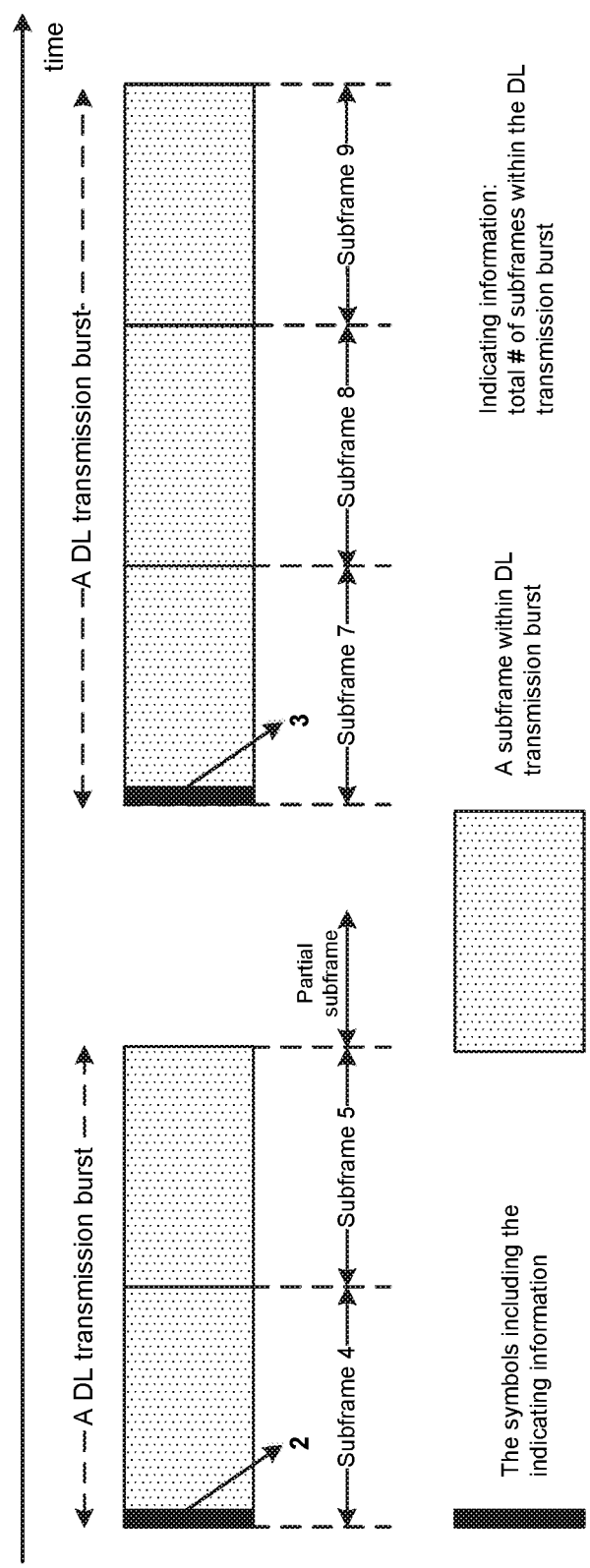
FIG. 3E illustrates a technique for indicating a total number of subframes within a downlink (DL) transmission burst at a starting subframe of each DL transmission burst in accordance with an example.
Figure 3F:
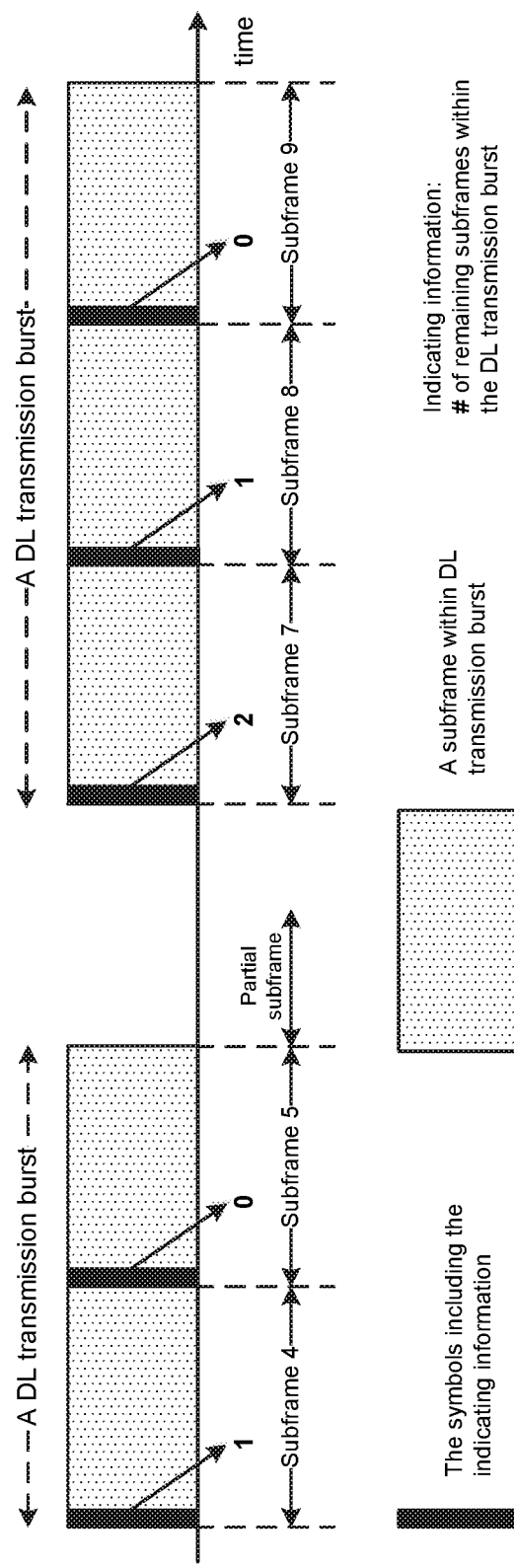
FIG. 3F illustrates a technique for indicating a number of remaining subframes within a downlink (DL) transmission burst at every subframe of the DL transmission burst in accordance with an example.

FIG. 3E illustrates an exemplary technique for indicating a total number of subframes within a downlink (DL) transmission burst at a starting subframe of each DL transmission burst. An eNodeB can explicitly indicate the total number of subframes within each DL transmission burst. In one example, the total number of subframes within the DL transmission burst can be indicated in a subset of subframes in the transmission burst, e.g., only in the first subframe of the DL transmission burst. In another example, the total number of subframes within the DL transmission burst can be indicated in every subframe within the DL transmission burst. This option can be useful for a UE to obtain the information quickly when the UE misses a first subframe, but this option can be inefficient due to increased overhead. As a non-limiting example, an eNodeB can transmit indication information of "2" at a starting subframe of a first DL transmission burst, wherein the "2" indicates that the DL transmission burst includes 2 subframes. As another non-limiting example, an eNodeB can transmit indication information of "3" at a starting subframe of a second DL transmission burst, wherein the "3" indicates that the DL transmission burst includes 3 subframes FIG. 3F illustrates an exemplary technique for indicating a number of remaining subframes within a downlink (DL) transmission burst at every subframe of the DL transmission burst. An eNodeB can explicitly indicate the number of remaining subframes within the DL transmission burst to a user equipment (UE). In one example, the number of remaining subframes within the DL transmission burst can be indicated in a subset of subframes within the DL transmission burst, e.g., in every other subframe. In another example, the number of remaining subframes is only indicated in the first subframe. As a non-limiting example, the eNodeB can transmit "1" at subframe 4 to indicate that there is one remaining subframe in the DL transmission burst. As another non-limiting example, the eNodeB can transmit "0" at subframe 5 to indicate that there are no remaining subframes in the DL transmission burst. As yet another non-limiting example, the eNodeB can transmit "2" at subframe 7 to indicate that there are two remaining subframes in the DL transmission burst In one configuration, the UE can receive information from the eNodeB using one of: downlink control information (DCI), a Physical Control Format Indicator Channel (PCFICH) or a CRS, and the information can enable the UE to distinguish subframes with different transmission powers when performing CSI measurements.

Figure 4A:
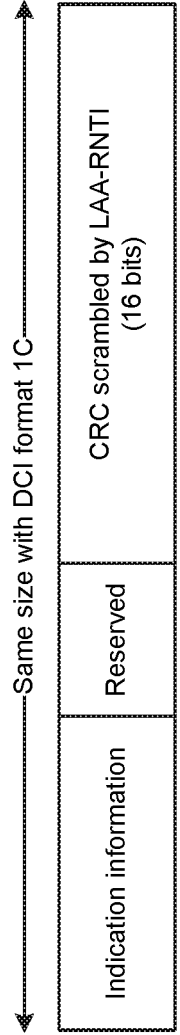
FIG. 4A illustrates a modified downlink control information (DCI) for signaling indicated information in accordance with an example.

FIG. 4A illustrates an example of a modified downlink control information (DCI) for signaling indicated information. A new DCI format can be designed with keeping a same size as compared to existing DL DCIs to avoid increasing blind decoding attempts at the UE side. In one design, the new DCI format can be a same size as compared to a 3GPP Release 12 DCI format 1C or 1A.

As shown in FIG. 4A, DCI format 1C can be modified to signal indication information from the eNodeB to the UE. In one example, an available payload in DCI format 1C (e.g., 12 bits without padding for 5 MHz systems) can be re-used to carry the indication information. In one example, CRC parity bits can be scrambled by a newly defined Radio Network Temporary Identifier (RNTI), referred to as an LAA RNTI, to indicate the new function of the modified DCI. The LAA RNTI can be fixed to one of the reserved RNTI values, i.e., FFF4-FFFC. In addition, the LAA RNTI can be configured by an eNodeB via a radio resource control (RRC) message, e.g., when configuring the LAA SCell. In one example, a search space for the new DCI format can be a common search space or a UE-group search space. The UE-group search space can be different from a UE-specific search space. The UE-group search space can be modified by changing a Cell RNTI (C-RNTI) used in the search space definition to the LAA-RNTI. Specifically, for each serving cell on which a physical downlink control channel (PDCCH) is monitored, the control channel elements (CCEs) corresponding to PDCCH candidate m of the UE-group search space $S_k^{(L)}$ are given by $L\{(Y_k+m) \bmod \lfloor N_{CCE,k}/L \rfloor\}+i$, where $m \in \{0, 1, \ldots, M^{(L)}-1\}$ is an index of the PDCCH candidate, $M^{(L)}$ is a number of PDCCH candidates to monitor in the given search space, $k=[n_s/2]$ denotes a subframe index with $n_s$ being a slot number within a radio frame, $L \in \{1, 2, 4, 8\}$ is an aggregation level, $N_{CCE,k}$ is a total number of CCEs in a control region of subframe k, $i \in \{0, 1, \ldots, L-1\}$, and $Y_k=(AY_{k-1}) \bmod D$ with $Y_{-1}=n_{RNTI}=LAA-RNTI \neq 0$, $A=39827$ and $D=65537$.

Figure 4B:
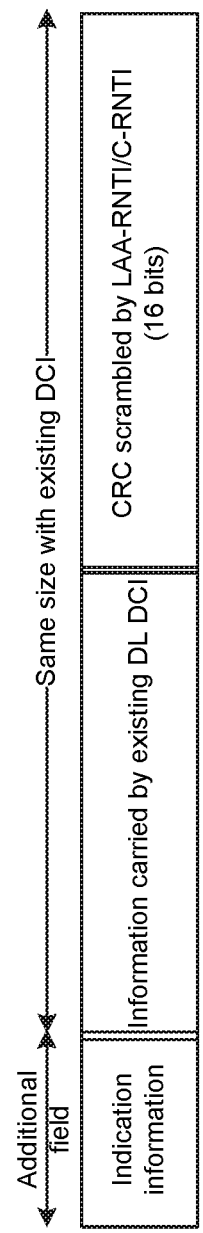
FIG. 4B illustrates a novel downlink control information (DCI) for signaling indicated information and the novel DCI is modified from a legacy DCI by adding additional fields to carry the indicated information in accordance with an example.

FIG. 4B illustrates an example of a novel downlink control information (DCI) for signaling indicated information and the novel DCI is modified from a legacy DCI by adding additional fields to carry the indicated information. The additional fields for carrying the indication information can be added to an existing DL DCI. For example, CRC parity bits can be scrambled by an LAA RNTI to indicate the new DCI, and the search space of this new DCI can either be common or UE-group search space. In another example, a C-RNTI can be re-used to scramble the CRC parity bits, and the search space can be UE-specific search space.

In one configuration, with respect to the PCFICH technique for sending the indication information from the eNodeB to the UE, by limiting a number of potential PDCCH sizes to be no more than two choices, there are available bits in the PCFICH, which can be used to carry the indication information. By fixing the PDCCH size, or configuring the PDCCH size semi-statically which can be indicated via higher layer signaling, there are 2 bits available in the PCFICH for transmitting the indication information. In one example, the 2 bits can be used to indicate toggling information to enable the UE to distinguish the DL transmission bursts. In another example, the PDCCH size can be fixed only in a starting (or ending) subframe of the DL transmission burst. In this case, the existing PCFICH can be used to indicate the starting (or ending) subframe of the DL transmission burst. Specifically, the PCFICH includes the following information {starting (ending) subframe, PDCCH size 1, PDCCH size 2, PDCCH size 3}, where the first indication is used to indicate the starting (ending) subframe, and the last three are used to indicate the PDCCH size in subframes other than the starting (ending) subframe of the DL transmission burst. In one example, by limiting the number of potential PDCCH sizes to two possible choices (e.g. 1 symbol or 2 symbols), there is 1 bit available in the PCFICH for the indication information. In one example, the 1 bit information can be used to indicate the starting/ending position of a DL transmission burst. In addition, the 1 bit information can be used for toggling information.

In one configuration, with respect to the CRS technique for sending the indication information from the eNodeB to the UE, a CRS sequence can be modified to transmit the indication information to the UE. While the CRS generation method is described in 3GPP Release 12, additional modifications can be made to the CRS to carry additional information other than only a cell ID and slot number.

As described in 3GPP Release 12, a CRS sequence in OFDM symbol l of slot $n_s$ is defined by $$r_{l,n_s}(m) = \frac{1}{\sqrt{2}}(1 - 2c(2m)) + j\frac{1}{\sqrt{2}}(1 - 2c(2m+1)),$$

where $m \in \{0, 1, \ldots, 2N_{RB}^{max,DL}-1\}$, and c(n) is a pseudo-random sequence defined by a length-31 Gold sequence. At the start of each OFDM symbol, c(n) is initialized by $c_{init}=2^{10}(7(n_s+1)+l+1)(2N_{ID}^{cell}+1)+2N_{ID}^{cell}+N_{CP}$, where $N_{ID}^{cell}$ is the cell ID and $N_{CP}$ denotes a type of cyclic prefix (CP) with $N_{CP}=1$ for normal CP and $N_{CP}=0$ for extended CP.

In one configuration, the indication information for the UE can be inserted in the CRS by modifying an initial value of the pseudo-random sequence generator for CRS generation as follows: $c_{init}=2^{10}(7(n_s+1)+l+1+\Sigma_{1 \leq i \leq 4} i*147x_i)(2N_{ID}^{cell}+1)+2N_{ID}^{cell}+N_{CP}$, where $x_i$ is a 1-bit information that can be inserted in the CRS. In one example, the CRS can be used with the following initial value to indicate the starting and ending positions of the DL transmission burst:

$$c_{init} = 2^{10}(7(n_s + 1) + l + 1 + 147x_{start} + 2*147x_{end})(2N_{ID}^{cell} + 1) + 2N_{ID}^{cell} + N_{CP},$$

where $$x_{start} = \begin{cases} 1, & \text{if slot } n_s \text{ is within the starting subframe of the burst} \\ 0, & \text{if slot } n_s \text{ is not within the starting subframe of the burst} \end{cases}$$

and $$x_{end} = \begin{cases} 1, & \text{if slot } n_s \text{ is within the ending subframe of the burst} \\ 0, & \text{if slot } n_s \text{ is not within the ending subframe of the burst} \end{cases}.$$

In one example, the CRS can be used to indicate a total or remaining number of subframes within the DL transmission burst. By introducing the phase modulation of CRS, additional indication information can be carried by the phase rotated CRS. In one example, the existing CRS can be extended to {CRS, −CRS}, which can provide additional 1-bit information. In one example, to indicate the starting (or ending) subframe of the DL transmission burst, −CRS can be transmitted in the starting (or ending) subframe of the DL transmission burst, while the CRS can be transmitted in subframes other than the starting (ending) subframe of the DL transmission burst.

In one configuration, a technique is described for distinguishing CSI measurements with CRS/CSI-RS of different transmission powers. In one example, a power difference of the CRS/CSI-RS with respect to a reference CRS/CSI-RS transmission power can be explicitly indicated to the UE. In one example, the power difference information can be transmitted in a subset of subframes within the DL transmission burst, e.g., only in the starting subframe of the DL transmission burst. In one example, the power difference information can be transmitted in every subframe within the DL transmission burst.

In one configuration, subframes that involve CSI measurements at the UE can be indicated to the UE. In one example, the indexes of subframes that involve CSI measurements at the UE can be explicitly indicated to the UE. In one example, the indexes of subframes that involve CSI measurements at the UE can be transmitted in a subset of subframes within the DL transmission burst, e.g., in the starting subframe of each radio frame within the DL transmission burst. In one example, the indexes of subframes that involve CSI measurements at the UE can be transmitted in every subframe within the DL transmission burst. In one example, the total number of subframes that do not involve CSI measurement at the UE can be indicated after each subframe that involves CSI measurements at the UE, e.g., in the subframes that involve CSI measurements, or following a subframe that does not involve CSI measurements. In one example, the number of remaining subframes that do involve CSI measurements at the UE can be indicated to the UE. In one example, the number of remaining subframes that do not involve CSI measurements at the UE can be transmitted in a subset of subframes within the DL transmission burst, e.g., in every other subframe in the DL transmission burst. In one example, the number of remaining subframes that do not involve CSI measurements at the UE can be transmitted in every subframe within the DL transmission burst. In one example, indication information can be used to indicate the subframes that involve CSI measurements at the UE. In one example, indication information can be transmitted in each subframe to indicate if the subframe involves CSI measurements at the UE. In one example, subframes that involve CSI measurements at the UE can be fixed within a radio frame, and indication information can be transmitted in each radio frame within the DL burst to indicate if these subframes in this radio frame involve the CSI measurements. In one example, subframes within each DL transmission burst (indexed from the starting of the DL transmission burst) that involve CSI measurements at the UE can be fixed, and indication information can be transmitted in each DL burst to indicate whether or not these subframes within the DL transmission burst involve CSI measurements at the UE.

In one configuration, subframes within different DL transmission bursts can be distinct. In one example, a starting and/or ending subframe of the DL transmission burst can be indicated to the UE. In one example, the indication for the starting and/or ending subframe of the DL transmission burst can be transmitted in a subset of subframes, e.g., only in starting and/or ending position of the DL transmission burst. In one example, the indication for the starting and/or ending subframe of the DL transmission burst can be transmitted in every subframe within the DL transmission burst. In one example, toggling information can be used to indicate the subframes within the same DL transmission burst. In one example, toggling information can be transmitted in a subset of subframes within the DL transmission burst, e.g., in the first subframe of the DL transmission burst. In one example, the toggling information can be transmitted in every subframe within the DL transmission burst. In one example, a total number of subframes within the DL transmission burst can be explicitly indicated to the UE. In one example, the indication of the total number of subframes within the DL transmission burst can be transmitted in a subset of subframes within the DL transmission burst, e.g., only in the first subframe of the DL transmission burst. In one example, the indication of the total number of subframes within the DL transmission burst can be transmitted in every subframe within the DL transmission burst. In one example, the number of remaining subframes within the DL transmission burst can be explicitly indicated to the UE. In one example, the indication of the number of remaining subframes within the DL transmission burst can be transmitted in a subset of subframes within the DL transmission burst, e.g., in every other subframe within the DL transmission burst. In one example, the indication of the number of remaining subframes within the DL transmission burst can be transmitted in every subframe within the DL transmission burst.

In one configuration, the indication information can be signaled based on DCI. The DCI can be modified while keeping a same size as compared to existing DL DCIs to avoid increasing blind decoding attempts at the UE side. In one example, DCI format 1C can be reused to carry the indication information with a CRC scrambled by a new defined RNTI, referred to as LAA-RNTI. In one example, a search space of the modified DCI can either be a common or UE-group search space. In one example, a new DCI can be used for signaling by adding additional fields for carrying the indication information to the existing DL DCI. In one example, the CRC can be scrambled by the LAA-RNTI to indicate the new DCI, and the search space of the new DCI can either be the common or UE-group search space. In one example, a C-RNTI can be reused to scramble the CRC, and the search space can be a UE-specific search space.

In one configuration, the indication information can be signaled using a PCFICH. The PCFICH can be used to indicate 1-bit or 2-bit information, by limiting the PDCCH sizes to two choices or fixing the PDCCH size, respectively.

In one configuration, the indication information can be signaled using CRS. The indication information can be inserted in the CRS by modifying an initial value of a pseudo-random sequence generator for CRS generation. In one example, 1-bit indication information can be inserted in the CRS by adding phase rotation to the CRS, i.e., either CRS or –CRS is transmitted and the selection depends on the indication information.

Figure 5:
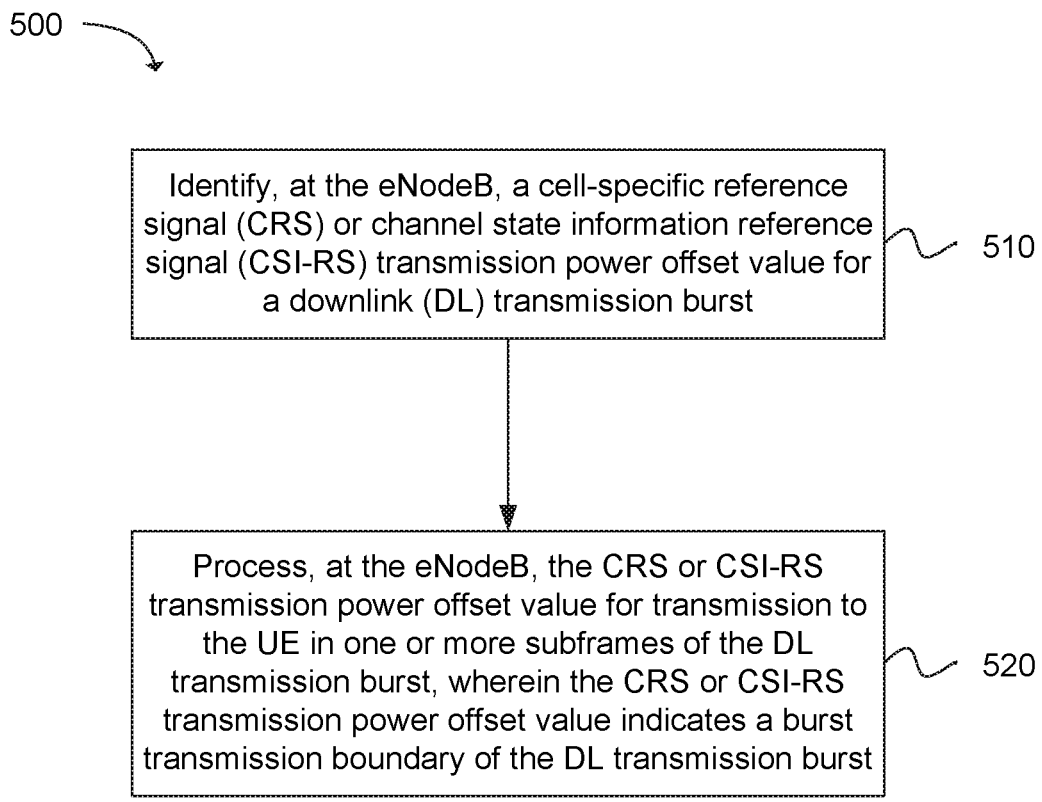
FIG. 5 depicts functionality of an eNodeB operable to enable channel state information (CSI) measurements at a user equipment (UE) in a License Assisted Access (LAA) system in accordance with an example.

Another example provides functionality 500 of an eNodeB operable to enable channel state information (CSI) measurements at a user equipment (UE) in a License Assisted Access (LAA) system, as shown in FIG. 5. The eNodeB can comprise one or more processors and memory configured to: identify, at the eNodeB, a cell-specific reference signal (CRS) or channel state information reference signal (CSI-RS) transmission power offset value for a downlink (DL) transmission burst, as in block 510. The eNodeB can comprise one or more processors and memory configured to: process, at the eNodeB, the CRS or CSI-RS transmission power offset value for transmission to the UE in one or more subframes of the DL transmission burst, wherein the CRS or CSI-RS transmission power offset value indicates a burst transmission boundary of the DL transmission burst, as in block 520.

Figure 6:
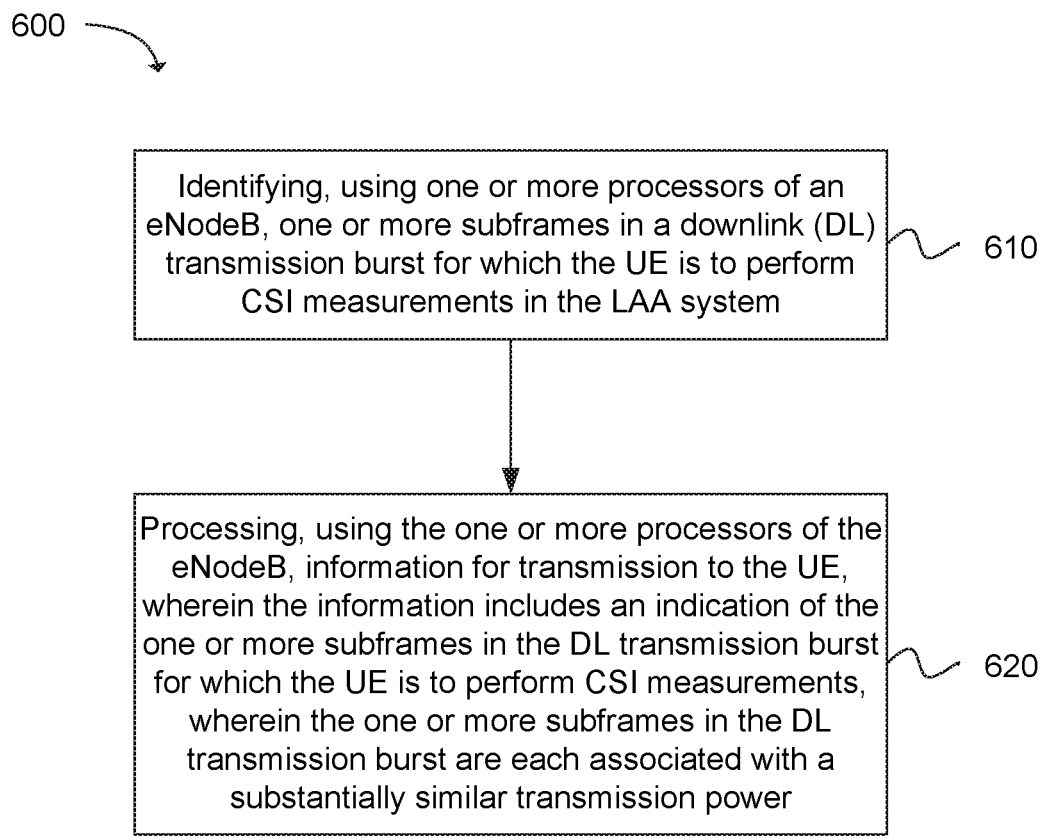
FIG. 6 depicts a flowchart of a machine readable storage medium having instructions embodied thereon for enabling channel state information (CSI) measurements at a user equipment (UE) in a License Assisted Access (LAA) system in accordance with an example.

Another example provides at least one machine readable storage medium having instructions 600 embodied thereon for enabling channel state information (CSI) measurements at a user equipment (UE) in a License Assisted Access (LAA) system, as shown in FIG. 6. The instructions can be executed on a machine, where the instructions are included on at least one computer readable medium or one non-transitory machine readable storage medium. The instructions when executed perform: identifying, using one or more processors of an eNodeB, one or more subframes in a downlink (DL) transmission burst for which the UE is to perform CSI measurements in the LAA system, as in block 610. The instructions when executed perform: processing, using the one or more processors of the eNodeB, information for transmission to the UE, wherein the information includes an indication of the one or more subframes in the DL transmission burst for which the UE is to perform CSI measurements, wherein the one or more subframes in the DL transmission burst are each associated with a substantially similar transmission power, as in block 620.

Figure 7:
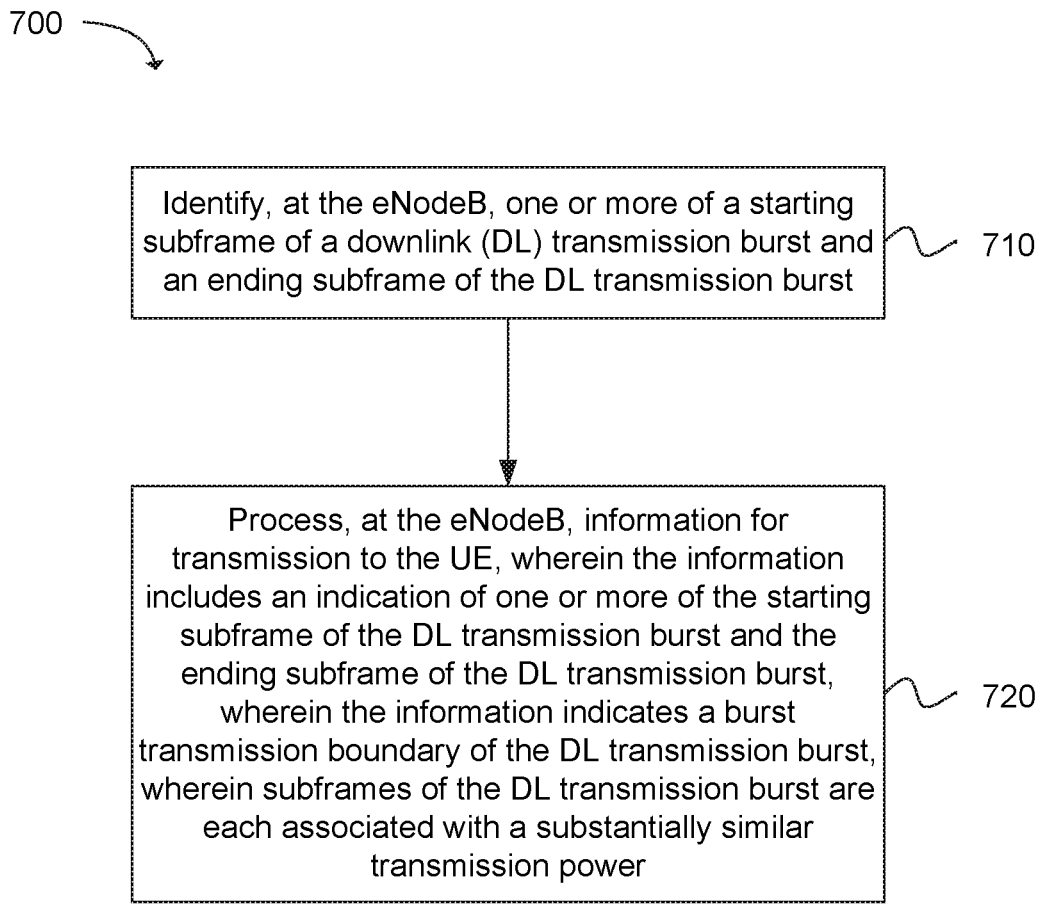
FIG. 7 depicts functionality of an eNodeB operable to enable channel state information (CSI) measurements at a user equipment (UE) in a License Assisted Access (LAA) system in accordance with an example.

Another example provides functionality 700 of an eNodeB operable to enable channel state information (CSI) measurements at a user equipment (UE) in a License Assisted Access (LAA) system, as shown in FIG. 7. The eNodeB can comprise one or more processors and memory configured to: identify, at the eNodeB, one or more of a starting subframe of a downlink (DL) transmission burst and an ending subframe of the DL transmission burst, as in block 710. The eNodeB can comprise one or more processors and memory configured to: process, at the eNodeB, information for transmission to the UE, wherein the information includes an indication of one or more of the starting subframe of the DL transmission burst and the ending subframe of the DL transmission burst, wherein the information indicates a burst transmission boundary of the DL transmission burst, wherein subframes of the DL transmission burst are each associated with a substantially similar transmission power, as in block 720.

Figure 8:
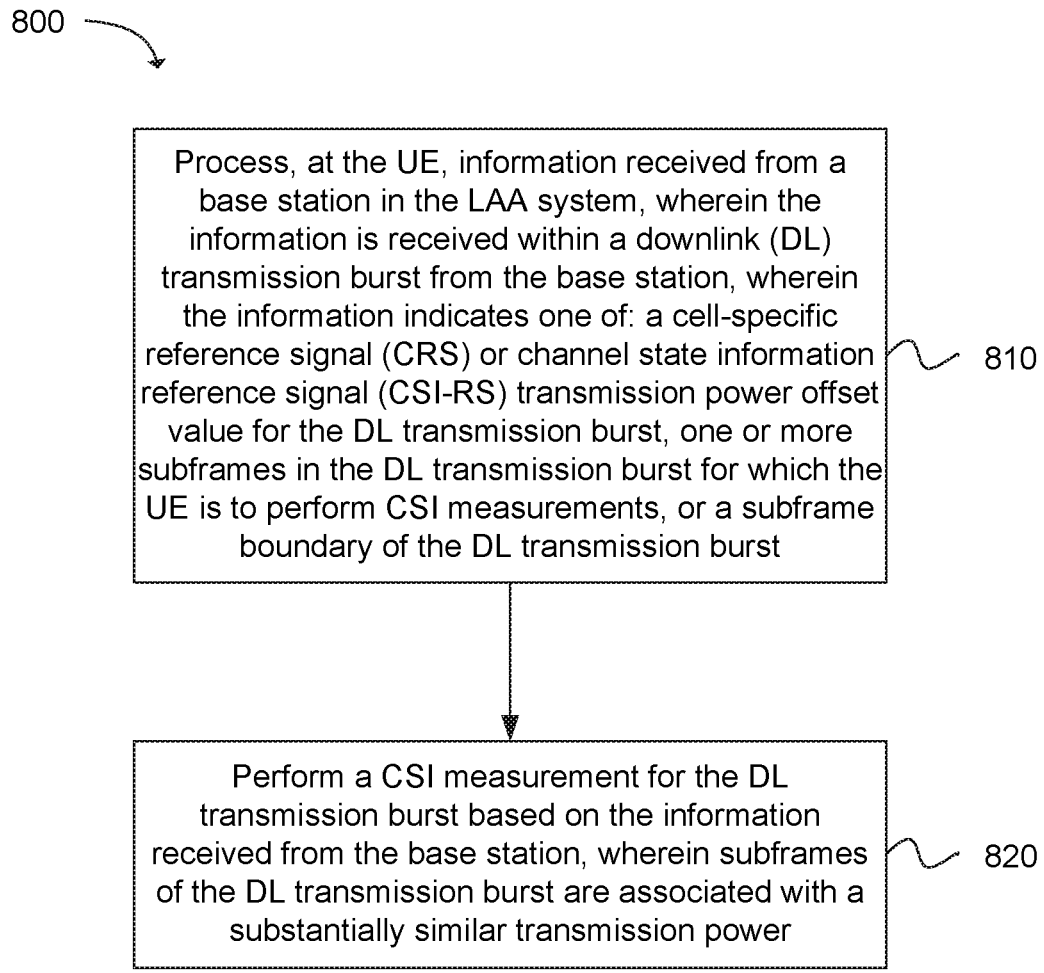
FIG. 8 depicts functionality of a user equipment (UE) operable to perform channel state information (CSI) measurements in a License Assisted Access (LAA) system in accordance with an example.

Another example provides functionality 800 of a user equipment (UE) operable to perform channel state information (CSI) measurements in a License Assisted Access (LAA) system, as in FIG. 8. The UE can comprise one or more processors and memory configured to: process, at the UE, information received from a base station in the LAA system, wherein the information is received within a downlink (DL) transmission burst from the base station, wherein the information indicates one of: a cell-specific reference signal (CRS) or channel state information reference signal (CSI-RS) transmission power offset value for the DL transmission burst, one or more subframes in the DL transmission burst for which the UE is to perform CSI measurements, or a subframe boundary of the DL transmission burst, as in block 810. The UE can comprise one or more processors and memory configured to: perform a CSI measurement for the DL transmission burst based on the information received from the base station, wherein subframes of the DL transmission burst are associated with a substantially similar transmission power, as in block 820.

Figure 9:
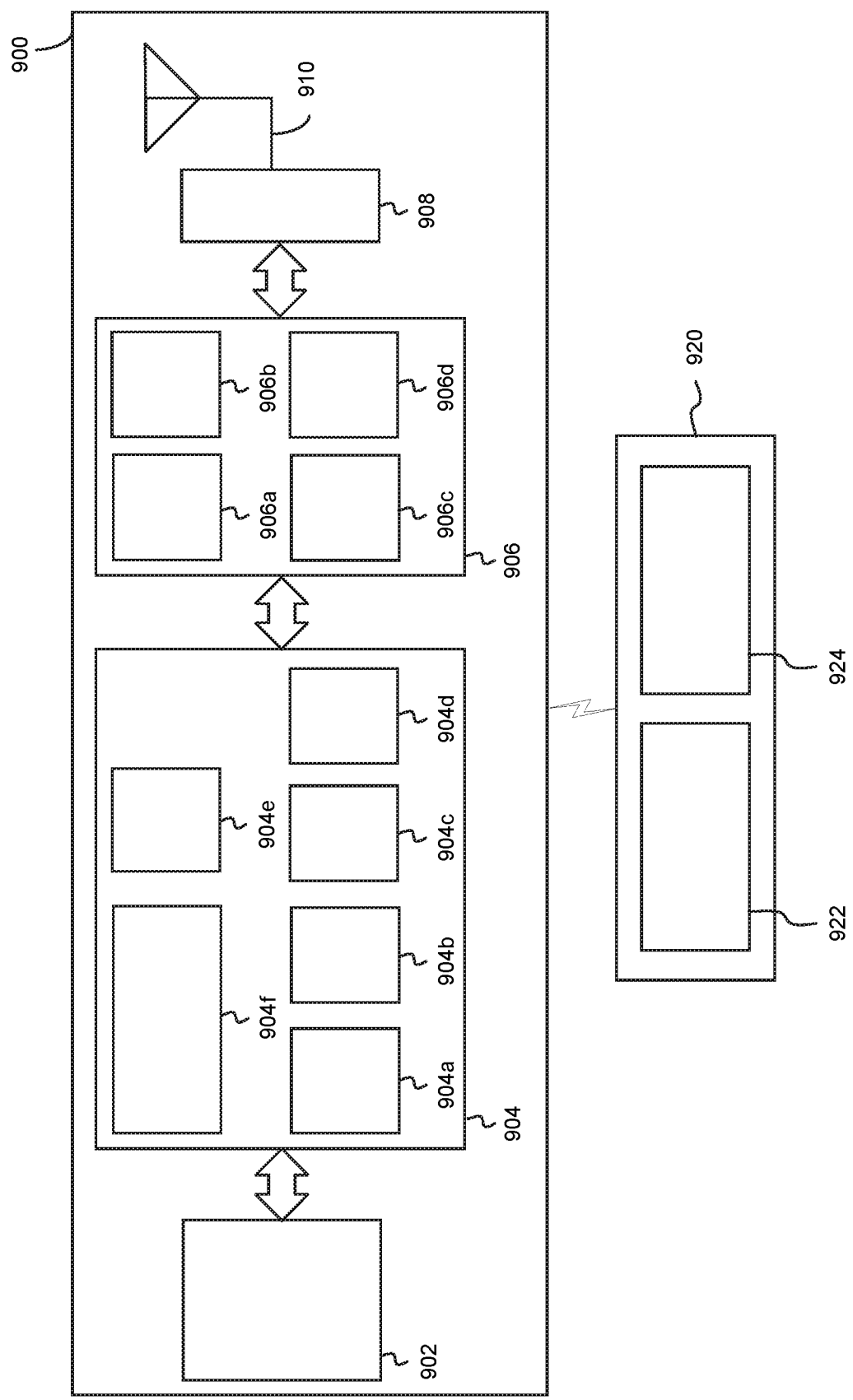
FIG. 9 illustrates a diagram of a wireless device (e.g., UE) in accordance with an example.

FIG. 9 provides an example illustration of a user equipment (UE) device 900, such as a wireless device, a mobile station (MS), a mobile wireless device, a mobile communication device, a tablet, a handset, or other type of wireless device. The UE device 900 can include one or more antennas configured to communicate with a node 920 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 920 can include one or more processors 922 and memory 924. The UE device 900 can be configured to communicate using at least one wireless communication standard including 3GPP LTE, WiMAX, High Speed Packet Access (HSPA), Bluetooth, and WiFi. The UE device 900 can communicate using separate antennas for each wireless communication standard or shared antennas for multiple wireless communication standards. The UE device 900 can communicate in a wireless local area network (WLAN), a wireless personal area network (WPAN), and/or a WWAN.

In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

The RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down-conversion and/or up-conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down-conversion and/or direct up-conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

Figure 10:
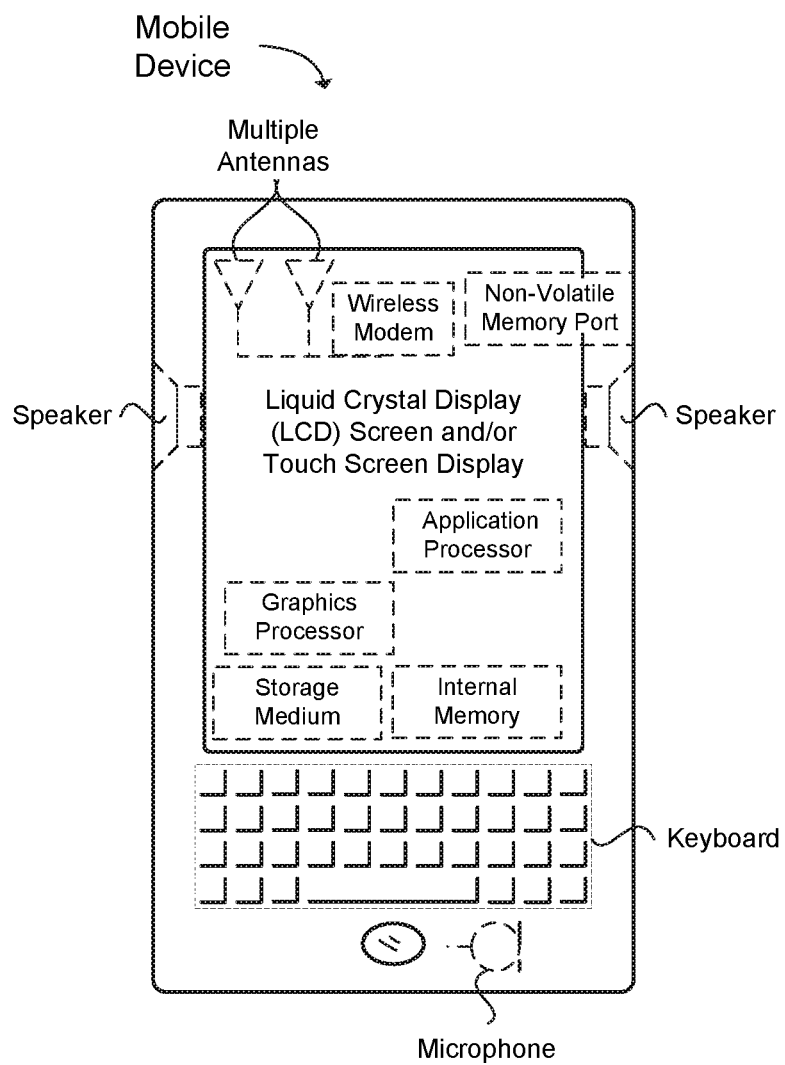
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of an eNodeB operable to enable channel state information (CSI) measurements at a user equipment (UE) in a License Assisted Access (LAA) system, the apparatus comprising one or more processors and memory configured to: identify, at the eNodeB, a cell-specific reference signal (CRS) or channel state information reference signal (CSI-RS) transmission power offset value for a downlink (DL) transmission burst; and process, at the eNodeB, the CRS or CSI-RS transmission power offset value for transmission to the UE in one or more subframes of the DL transmission burst, wherein the CRS or CSI-RS transmission power offset value indicates a burst transmission boundary of the DL transmission burst.

Example 2 includes the apparatus of Example 1, wherein: CRS or CSI-RS transmissions are associated with a same transmission power offset in each subframe of the DL transmission burst; and CRS or CSI-RS transmissions are not associated with a same transmission power offset across different DL transmission bursts.

Example 3 includes the apparatus of any of Examples 1 to 2, further configured to process the CRS or CSI-RS transmission power offset value for transmission to the UE in a defined subset of subframes in the DL transmission burst, wherein the defined subset of subframes includes a starting subframe of the DL transmission burst, every other subframe of the DL transmission burst, or in every subframe of the DL transmission burst.

Example 4 includes the apparatus of any of Examples 1 to 3, wherein the CRS or CSI-RS transmission power offset value enables the UE to distinguish subframes with different CRS or CSI-RS transmission powers when performing CSI measurements for DL transmission bursts in the LAA system.

Example 5 includes the apparatus of any of Examples 1 to 4, wherein the CRS or CSI-RS transmission power offset value indicates a ratio of CRS or CSI-RS energy per resource element (EPRE) in the DL transmission burst to a reference CRS or CSI-RS EPRE.

Example 6 includes the apparatus of any of Examples 1 to 5, wherein the CRS or CSI-RS transmission power offset value is transmitted from the eNodeB to the UE using one of: downlink control information (DCI), a Physical Control Format Indicator Channel (PCFICH) or a CRS.

Example 7 includes at least one machine readable storage medium having instructions embodied thereon for enabling channel state information (CSI) measurements at a user equipment (UE) in a License Assisted Access (LAA) system, the instructions when executed perform the following: identifying, using one or more processors of an eNodeB, one or more subframes in a downlink (DL) transmission burst for which the UE is to perform CSI measurements in the LAA system; and processing, using the one or more processors of the eNodeB, information for transmission to the UE, wherein the information includes an indication of the one or more subframes in the DL transmission burst for which the UE is to perform CSI measurements, wherein the one or more subframes in the DL transmission burst are each associated with a substantially similar transmission power.

Example 8 includes the at least one machine readable storage medium of Example 7, wherein the information transmitted from the eNodeB includes an indication of one or more subframes in the DL transmission burst for which the UE is to not perform CSI measurements, wherein the information is indicated in a subframe within the DL transmission burst for which the UE is to perform CSI measurements.

Example 9 includes the at least one machine readable storage medium of any of Examples 7-8, wherein the information transmitted from the eNodeB includes an indication of one or more subframes in the DL transmission burst for which the UE is to not perform CSI measurements, wherein the information is indicated in a subframe within the DL transmission burst for which the UE is to not perform CSI measurements.

Example 10 includes the at least one machine readable storage medium of any of Examples 7-9, wherein the information transmitted from the eNodeB includes an indication of a number of remaining subframes in the DL transmission burst for which the UE is to not perform CSI measurements, wherein the information is transmitted to the UE in every subframe of the DL transmission burst.

Example 11 includes the at least one machine readable storage medium of any of Examples 7-10, wherein the information transmitted from the eNodeB includes an indication for every subframe of the DL transmission burst, wherein "1" indicates that the UE is to perform CSI measurements for a defined subframe and "0" indicates that the UE is to not perform CSI measurements for a defined subframe.

Example 12 includes the at least one machine readable storage medium of any of Examples 7-11, wherein the information transmitted from the eNodeB includes an indication that the UE is to perform CSI measurements for a predefined subset of subframes within the DL transmission burst.

Example 13 includes the at least one machine readable storage medium of any of Examples 7-12, wherein the information is transmitted from the eNodeB to the UE using one of: downlink control information (DCI), a Physical Control Format Indicator Channel (PCFICH) or a CRS, wherein the information enables the UE to identify the DL transmission burst and distinguish subframes with different transmission powers when performing CSI measurements.

Example 14 includes an apparatus of an eNodeB operable to enable channel state information (CSI) measurements at a user equipment (UE) in a License Assisted Access (LAA) system, the apparatus comprising one or more processors and memory configured to: identify, at the eNodeB, one or more of a starting subframe of a downlink (DL) transmission burst and an ending subframe of the DL transmission burst; and process, at the eNodeB, information for transmission to the UE, wherein the information includes an indication of one or more of the starting subframe of the DL transmission burst and the ending subframe of the DL transmission burst, wherein the information indicates a burst transmission boundary of the DL transmission burst, wherein subframes of the DL transmission burst are each associated with a substantially similar transmission power.

Example 15 includes the apparatus of Example 14, wherein the information transmitted from the eNodeB includes an indication for a defined subset of subframes in the DL transmission burst, wherein the defined subset includes every subframe in the DL transmission burst, wherein: an indication of "1" specifies a starting subframe of the DL transmission burst and an indication of "0" specifies a non-starting subframe of the DL transmission burst; or an indication of "1" specifies a starting subframe of the DL transmission burst and no indication specifies a non-starting subframe of the DL transmission burst; or an indication of "1" specifies an ending subframe of the DL transmission burst and an indication of "0" specifies a non-ending subframe of the DL transmission burst; or an indication of "1" specifies an ending subframe of the DL transmission burst and no indication specifies a non-ending subframe of the DL transmission burst; or an indication of a first predefined value specifies a starting subframe of the DL transmission burst, an indication of a second predefined value specifies neither a starting subframe nor an ending subframe of the DL transmission burst, and an indication of a third predefined value indicates an ending subframe of the DL transmission burst, wherein the first predefined value is "0", the second predefined value is "1" and the third predefined value is "2".

Example 16 includes the apparatus of any of Examples 14 to 15, wherein the information transmitted from the eNodeB includes toggling information to indicate the starting subframe of the DL transmission burst, wherein "0" indicates a starting subframe of a DL transmission burst and "1" indicates a starting subframe of a following DL transmission burst.

Example 17 includes the apparatus of any of Examples 14 to 16, wherein the information transmitted from the eNodeB includes toggling information for every subframe of the DL transmission burst, wherein the toggling information includes one or more bits to indicate a subframe belonging to a defined DL transmission burst, wherein a length of the toggling information is fixed or semi-statically configured via radio resource control (RRC) signaling.

Example 18 includes the apparatus of any of Examples 14 to 17, wherein the information transmitted from the eNodeB includes an indication of a total number of subframes in the DL transmission burst, wherein the information is transmitted in the starting subframe of the DL transmission burst.

Example 19 includes the apparatus of any of Examples 14 to 18, wherein the information transmitted from the eNodeB includes an indication of a remaining number of subframes in the DL transmission burst, wherein the information is transmitted in a defined subset of subframes in the DL transmission burst, wherein the defined subset of subframes includes every other subframe of the DL transmission burst or in every subframe of the DL transmission burst Example 20 includes the apparatus of any of Examples 14 to 19, wherein the information is transmitted from the eNodeB to the UE using one of: downlink control information (DCI), a Physical Control Format Indicator Channel (PCFICH) or a CRS, wherein the information enables the UE to distinguish subframes with different transmission powers when performing CSI measurements.

Example 21 includes an apparatus of a user equipment (UE) operable to perform channel state information (CSI) measurements in a License Assisted Access (LAA) system, the apparatus comprising one or more processors and memory configured to: process, at the UE, information received from a base station in the LAA system, wherein the information is received within a downlink (DL) transmission burst from the base station, wherein the information indicates one of: a cell-specific reference signal (CRS) or channel state information reference signal (CSI-RS) transmission power offset value for the DL transmission burst, one or more subframes in the DL transmission burst for which the UE is to perform CSI measurements, or a subframe boundary of the DL transmission burst; and perform a CSI measurement for the DL transmission burst based on the information received from the base station, wherein subframes of the DL transmission burst are associated with a substantially similar transmission power.

Example 22 includes the apparatus of Example 21, further comprising radio frequency (RF) circuitry to receive the information from the eNodeB, wherein the information is received from the eNodeB using one of: downlink control information (DCI), a Physical Control Format Indicator Channel (PCFICH) or a CRS, wherein the information enables the UE to distinguish subframes with different transmission powers when performing CSI measurements.

Example 23 includes the apparatus of any of Examples 21 to 22, further comprising radio frequency (RF) circuitry to receive the information from the eNodeB, wherein the information enables the UE to distinguish subframes with different transmission powers when performing CSI measurements, wherein the information is received from the eNodeB using one of: downlink control information (DCI), wherein the DCI has a length that corresponds to DCI format 1C, wherein the DCI includes an LAA radio network temporary identifier (RNTI), wherein a search space of the DCI is a common search space or a UE-group search space; a Physical Control Format Indicator Channel (PCFICH), wherein a size of a physical downlink control channel (PDCCH) is fixed; or a modified CRS that includes indication information included for CRS generation, wherein the modified CRS uses additional phase modulation to carry 1 bit information.

Example 24 includes the apparatus of any of Examples 21 to 23, wherein the UE includes at least one of an antenna, a touch sensitive display screen, a speaker, a microphone, a graphics processor, an application processor, a baseband processor, an internal memory, a non-volatile memory port, and combinations thereof.

Example 25 includes an eNodeB operable to enable channel state information (CSI) measurements at a user equipment (UE) in a License Assisted Access (LAA) system, the eNodeB comprising: means for identifying one or more subframes in a downlink (DL) transmission burst for which the UE is to perform CSI measurements in the LAA system; and means for processing information for transmission to the UE, wherein the information includes an indication of the one or more subframes in the DL transmission burst for which the UE is to perform CSI measurements, wherein the one or more subframes in the DL transmission burst are each associated with a substantially similar transmission power.

Example 26 includes the eNodeB of Example 25, wherein the information transmitted from the eNodeB includes an indication of one or more subframes in the DL transmission burst for which the UE is to not perform CSI measurements, wherein the information is indicated in a subframe within the DL transmission burst for which the UE is to perform CSI measurements.

Example 27 includes the eNodeB of any of Examples 25 to 26, wherein the information transmitted from the eNodeB includes an indication of one or more subframes in the DL transmission burst for which the UE is to not perform CSI measurements, wherein the information is indicated in a subframe within the DL transmission burst for which the UE is to not perform CSI measurements.

Example 28 includes the eNodeB of any of Examples 25 to 27, wherein the information transmitted from the eNodeB includes an indication of a number of remaining subframes in the DL transmission burst for which the UE is to not perform CSI measurements, wherein the information is transmitted to the UE in every subframe of the DL transmission burst.

Example 29 includes the eNodeB of any of Examples 25 to 28, wherein the information transmitted from the eNodeB includes an indication for every subframe of the DL transmission burst, wherein "1" indicates that the UE is to perform CSI measurements for a defined subframe and "0" indicates that the UE is to not perform CSI measurements for a defined subframe.

Example 30 includes the eNodeB of any of Examples 25 to 29, wherein the information transmitted from the eNodeB includes an indication that the UE is to perform CSI measurements for a predefined subset of subframes within the DL transmission burst.

Example 31 includes the eNodeB of any of Examples 25 to 30, wherein the information is transmitted from the eNodeB to the UE using one of: downlink control information (DCI), a Physical Control Format Indicator Channel (PCFICH) or a CRS, wherein the information enables the UE to identify the DL transmission burst and distinguish subframes with different transmission powers when performing CSI measurements.

Example 32 includes an apparatus of an eNodeB operable to enable channel state information (CSI) measurements at a user equipment (UE) in a License Assisted Access (LAA) system, the apparatus comprising one or more processors and memory configured to: identify, at the eNodeB, a cell-specific reference signal (CRS) or channel state information reference signal (CSI-RS) transmission power offset value for a downlink (DL) transmission burst; and process, at the eNodeB, the CRS or CSI-RS transmission power offset value for transmission to the UE in one or more subframes of the DL transmission burst, wherein the CRS or CSI-RS transmission power offset value indicates a burst transmission boundary of the DL transmission burst.

Example 33 includes the apparatus of Example 32, wherein: CRS or CSI-RS transmissions are associated with a same transmission power offset in each subframe of the DL transmission burst; and CRS or CSI-RS transmissions are not associated with a same transmission power offset across different DL transmission bursts.

Example 34 includes the apparatus of any of Examples 32 to 33, further configured to process the CRS or CSI-RS transmission power offset value for transmission to the UE in a defined subset of subframes in the DL transmission burst, wherein the defined subset of subframes includes a starting subframe of the DL transmission burst, every other subframe of the DL transmission burst, or in every subframe of the DL transmission burst.

Example 35 includes the apparatus of any of Examples 32 to 34, wherein: the CRS or CSI-RS transmission power offset value enables the UE to distinguish subframes with different CRS or CSI-RS transmission powers when performing CSI measurements for DL transmission bursts in the LAA system; or the CRS or CSI-RS transmission power offset value indicates a ratio of CRS or CSI-RS energy per resource element (EPRE) in the DL transmission burst to a reference CRS or CSI-RS EPRE; or the CRS or CSI-RS transmission power offset value is transmitted from the eNodeB to the UE using one of: downlink control information (DCI), a Physical Control Format Indicator Channel (PCFICH) or a CRS.

Example 36 includes at least one machine readable storage medium having instructions embodied thereon for enabling channel state information (CSI) measurements at a user equipment (UE) in a License Assisted Access (LAA) system, the instructions when executed perform the following: identifying, using one or more processors of an eNodeB, one or more subframes in a downlink (DL) transmission burst for which the UE is to perform CSI measurements in the LAA system; and processing, using the one or more processors of the eNodeB, information for transmission to the UE, wherein the information includes an indication of the one or more subframes in the DL transmission burst for which the UE is to perform CSI measurements, wherein the one or more subframes in the DL transmission burst are each associated with a substantially similar transmission power.

Example 37 includes the at least one machine readable storage medium of Example 36, wherein: the information transmitted from the eNodeB includes an indication of one or more subframes in the DL transmission burst for which the UE is to not perform CSI measurements, wherein the information is indicated in a subframe within the DL transmission burst for which the UE is to perform CSI measurements; or the information transmitted from the eNodeB includes an indication of one or more subframes in the DL transmission burst for which the UE is to not perform CSI measurements, wherein the information is indicated in a subframe within the DL transmission burst for which the UE is to not perform CSI measurements; or the information transmitted from the eNodeB includes an indication of a number of remaining subframes in the DL transmission burst for which the UE is to not perform CSI measurements, wherein the information is transmitted to the UE in every subframe of the DL transmission burst.

Example 38 includes the at least one machine readable storage medium of any of Examples 36 to 37, wherein: the information transmitted from the eNodeB includes an indication for every subframe of the DL transmission burst, wherein "1" indicates that the UE is to perform CSI measurements for a defined subframe and "0" indicates that the UE is to not perform CSI measurements for a defined subframe; or the information transmitted from the eNodeB includes an indication that the UE is to perform CSI measurements for a predefined subset of subframes within the DL transmission burst.

Example 39 includes the at least one machine readable storage medium of any of Examples 36 to 38, wherein the information is transmitted from the eNodeB to the UE using one of: downlink control information (DCI), a Physical Control Format Indicator Channel (PCFICH) or a CRS, wherein the information enables the UE to identify the DL transmission burst and distinguish subframes with different transmission powers when performing CSI measurements.

Example 40 includes an apparatus of an eNodeB operable to enable channel state information (CSI) measurements at a user equipment (UE) in a License Assisted Access (LAA) system, the apparatus comprising one or more processors and memory configured to: identify, at the eNodeB, one or more of a starting subframe of a downlink (DL) transmission burst or an ending subframe of the DL transmission burst; and process, at the eNodeB, information for transmission to the UE, wherein the information includes an indication of one or more of the starting subframe of the DL transmission burst or the ending subframe of the DL transmission burst, wherein the information indicates a burst transmission boundary of the DL transmission burst, wherein subframes of the DL transmission burst are each associated with a substantially similar transmission power.

Example 41 includes the apparatus of Example 40, wherein the information transmitted from the eNodeB includes an indication for a defined subset of subframes in the DL transmission burst, wherein the defined subset includes every subframe in the DL transmission burst, wherein: an indication of "1" specifies a starting subframe of the DL transmission burst and an indication of "0" specifies a non-starting subframe of the DL transmission burst; or an indication of "1" specifies a starting subframe of the DL transmission burst and no indication specifies a non-starting subframe of the DL transmission burst; or an indication of "1" specifies an ending subframe of the DL transmission burst and an indication of "0" specifies a non-ending subframe of the DL transmission burst; or an indication of "1" specifies an ending subframe of the DL transmission burst and no indication specifies a non-ending subframe of the DL transmission burst; or an indication of "1" specifies a starting subframe of the DL transmission burst and an indication of "0" specifies an ending subframe of the DL transmission burst; or an indication of a first predefined value specifies a starting subframe of the DL transmission burst, an indication of a second predefined value specifies neither a starting subframe nor an ending subframe of the DL transmission burst, and an indication of a third predefined value indicates an ending subframe of the DL transmission burst, wherein the first predefined value is "0", the second predefined value is "1" and the third predefined value is "2".

Example 42 includes the apparatus of any of Examples 40 to 41, wherein: the information transmitted from the eNodeB includes toggling information to indicate the starting subframe of the DL transmission burst, wherein "0" indicates a starting subframe of a DL transmission burst and "1" indicates a starting subframe of a following DL transmission burst; or the information transmitted from the eNodeB includes toggling information for every subframe of the DL transmission burst, wherein the toggling information includes one or more bits to indicate a subframe belonging to a defined DL transmission burst, wherein a length of the toggling information is fixed or semi-statically configured via radio resource control (RRC) signaling.

Example 43 includes the apparatus of any of Examples 40 to 42, wherein: the information transmitted from the eNodeB includes an indication of a total number of subframes in the DL transmission burst, wherein the information is transmitted in the starting subframe of the DL transmission burst; or the information transmitted from the eNodeB includes an indication of a remaining number of subframes in the DL transmission burst, wherein the information is transmitted in a defined subset of subframes in the DL transmission burst, wherein the defined subset of subframes includes every other subframe of the DL transmission burst or in every subframe of the DL transmission burst; or the information is transmitted from the eNodeB to the UE using one of: downlink control information (DCI), a Physical Control Format Indicator Channel (PCFICH) or a CRS, wherein the information enables the UE to distinguish subframes with different transmission powers when performing CSI measurements.

Example 44 includes an apparatus of a user equipment (UE) operable to perform channel state information (CSI) measurements in a License Assisted Access (LAA) system, the apparatus comprising one or more processors and memory configured to: process, at the UE, information received from a base station in the LAA system, wherein the information is received within a downlink (DL) transmission burst from the base station, wherein the information indicates one of: a cell-specific reference signal (CRS) or channel state information reference signal (CSI-RS) transmission power offset value for the DL transmission burst, one or more subframes in the DL transmission burst for which the UE is to perform CSI measurements, or a subframe boundary of the DL transmission burst; and perform a CSI measurement for the DL transmission burst based on the information received from the base station, wherein subframes of the DL transmission burst are associated with a substantially similar transmission power.

Example 45 includes the apparatus of Example 44, further comprising radio frequency (RF) circuitry to receive the information from the eNodeB, wherein the information is received from the eNodeB using one of: downlink control information (DCI), a Physical Control Format Indicator Channel (PCFICH) or a CRS, wherein the information enables the UE to distinguish subframes with different transmission powers when performing CSI measurements.

Example 46 includes the apparatus of any of Examples 44 to 45, further comprising radio frequency (RF) circuitry to receive the information from the eNodeB, wherein the information enables the UE to distinguish subframes with different transmission powers when performing CSI measurements, wherein the information is received from the eNodeB using one of: downlink control information (DCI), wherein the DCI has a length that corresponds to DCI format 1C, wherein the DCI includes an LAA radio network temporary identifier (RNTI), wherein a search space of the DCI is a common search space or a UE-group search space; a Physical Control Format Indicator Channel (PCFICH), wherein a size of a physical downlink control channel (PDCCH) is fixed; or a modified CRS that includes indication information included for CRS generation, wherein the modified CRS uses additional phase modulation to carry 1 bit information.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to enable channel state information (CSI) measurements at a user equipment (UE) in a License Assisted Access (LAA) system, the apparatus comprising one or more processors and memory configured to:

identify, at the eNodeB, a cell-specific reference signal (CRS) or channel state information reference signal (CSI-RS) transmission power offset value for a downlink (DL) transmission burst, wherein the CRS or CSI-RS transmission power offset value enables the UE to distinguish subframes with different CRS or CSI-RS transmission powers when performing CSI measurements for DL transmission bursts in the LAA system; and process, at the eNodeB, the CRS or CSI-RS transmission power offset value for transmission to the UE in one or more subframes of the DL transmission burst, wherein the CRS or CSI-RS transmission power offset value indicates a burst transmission boundary of the DL transmission burst.

2. The apparatus of claim 1, wherein:

CRS or CSI-RS transmissions are associated with a same transmission power offset in each subframe of the DL transmission burst; and CRS or CSI-RS transmissions are not associated with a same transmission power offset across different DL transmission bursts.

3. The apparatus of claim 1, further configured to process the CRS or CSI-RS transmission power offset value for transmission to the UE in a defined subset of subframes in the DL transmission burst, wherein the defined subset of subframes includes a starting subframe of the DL transmission burst, every other subframe of the DL transmission burst, or in every subframe of the DL transmission burst.

4. The apparatus of claim 1, wherein the CRS or CSI-RS transmission power offset value indicates a ratio of CRS or CSI-RS energy per resource element (EPRE) in the DL transmission burst to a reference CRS or CSI-RS EPRE.

5. The apparatus of claim 1, wherein the CRS or CSI-RS transmission power offset value is transmitted from the eNodeB to the UE using one of: downlink control information (DCI), a Physical Control Format Indicator Channel (PCFICH) or a CRS.

6. At least one non-transitory machine readable storage medium having instructions embodied thereon for enabling channel state information (CSI) measurements at a user equipment (UE) in a License Assisted Access (LAA) system, the instructions when executed perform the following:
    identifying, using one or more processors of an eNodeB, one or more subframes in a downlink (DL) transmission burst for which the UE is to perform CSI measurements in the LAA system; and
    processing, using the one or more processors of the eNodeB, information for transmission to the UE, wherein the information includes an indication of the one or more subframes in the DL transmission burst for which the UE is to perform CSI measurements, wherein the one or more subframes in the DL transmission burst are each associated with a substantially similar transmission power, and
    processing, using the one or more processors of the eNodeB, information for transmission to the UE, wherein the information further includes an indication of one or more subframes in the DL transmission burst for which the UE is to not perform CSI measurements, wherein the information is indicated in a subframe within the DL transmission burst for which the UE is to perform CSI measurements.

7. The at least one non-transitory machine readable storage medium of claim 6, wherein the information transmitted from the eNodeB includes an indication of one or more subframes in the DL transmission burst for which the UE is to not perform CSI measurements, wherein the information is indicated in a subframe within the DL transmission burst for which the UE is to not perform CSI measurements.

8. The at least one non-transitory machine readable storage medium of claim 6, wherein the information transmitted from the eNodeB includes an indication of a number of remaining subframes in the DL transmission burst for which the UE is to not perform CSI measurements, wherein the information is transmitted to the UE in every subframe of the DL transmission burst.

9. The at least one non-transitory machine readable storage medium of claim 6, wherein the information transmitted from the eNodeB includes an indication for every subframe of the DL transmission burst, wherein "1" indicates that the UE is to perform CSI measurements for a defined subframe and "0" indicates that the UE is to not perform CSI measurements for a defined subframe.

10. The at least one non-transitory machine readable storage medium of claim 6, wherein the information transmitted from the eNodeB includes an indication that the UE is to perform CSI measurements for a predefined subset of subframes within the DL transmission burst.

11. The at least one non-transitory machine readable storage medium of claim 6, wherein the information is transmitted from the eNodeB to the UE using one of: downlink control information (DCI), a Physical Control Format Indicator Channel (PCFICH) or a CRS, wherein the information enables the UE to identify the DL transmission burst and distinguish subframes with different transmission powers when performing CSI measurements.

12. An apparatus of an eNodeB operable to enable channel state information (CSI) measurements at a user equipment (UE) in a License Assisted Access (LAA) system, the apparatus comprising one or more processors and memory configured to:
    identify, at the eNodeB, one or more of a starting subframe of a downlink (DL) transmission burst or an ending subframe of the DL transmission burst; and
    process, at the eNodeB, information for transmission to the UE, wherein the information includes an indication of one or more of the starting subframe of the DL transmission burst or the ending subframe of the DL transmission burst, wherein the information indicates a burst transmission boundary of the DL transmission burst, wherein subframes of the DL transmission burst are each associated with a substantially similar transmission power.

13. The apparatus of claim 12, wherein the information transmitted from the eNodeB includes an indication for a defined subset of subframes in the DL transmission burst, wherein the defined subset includes every subframe in the DL transmission burst, wherein:
    an indication of "1" specifies a starting subframe of the DL transmission burst and an indication of "0" specifies a non-starting subframe of the DL transmission burst; or
    an indication of "1" specifies a starting subframe of the DL transmission burst and no indication specifies a non-starting subframe of the DL transmission burst; or
    an indication of "1" specifies an ending subframe of the DL transmission burst and an indication of "0" specifies a non-ending subframe of the DL transmission burst; or
    an indication of "1" specifies an ending subframe of the DL transmission burst and no indication specifies a non-ending subframe of the DL transmission burst; or
    an indication of "1" specifies a starting subframe of the DL transmission burst and an indication of "0" specifies an ending subframe of the DL transmission burst; or
    an indication of a first predefined value specifies a starting subframe of the DL transmission burst, an indication of a second predefined value specifies neither a starting subframe nor an ending subframe of the DL transmission burst, and an indication of a third predefined value indicates an ending subframe of the DL transmission burst, wherein the first predefined value is "0", the second predefined value is "1" and the third predefined value is "2".

14. The apparatus of claim 12, wherein the information transmitted from the eNodeB includes toggling information to indicate the starting subframe of the DL transmission burst, wherein "0" indicates a starting subframe of a DL transmission burst and "1" indicates a starting subframe of a following DL transmission burst.

15. The apparatus of claim 12, wherein the information transmitted from the eNodeB includes toggling information for every subframe of the DL transmission burst, wherein the toggling information includes one or more bits to indicate a subframe belonging to a defined DL transmission burst, wherein a length of the toggling information is fixed or semi-statically configured via radio resource control (RRC) signaling.

16. The apparatus of claim 12, wherein the information transmitted from the eNodeB includes an indication of a total number of subframes in the DL transmission burst, wherein the information is transmitted in the starting subframe of the DL transmission burst.

17. The apparatus of claim 12, wherein the information transmitted from the eNodeB includes an indication of a remaining number of subframes in the DL transmission burst, wherein the information is transmitted in a defined subset of subframes in the DL transmission burst, wherein the defined subset of subframes includes every other subframe of the DL transmission burst or in every subframe of the DL transmission burst.

18. The apparatus of claim 12, wherein the information is transmitted from the eNodeB to the UE using one of: downlink control information (DCI), a Physical Control Format Indicator Channel (PCFICH) or a CRS, wherein the information enables the UE to distinguish subframes with different transmission powers when performing CSI measurements.

19. An apparatus of a user equipment (UE) operable to perform channel state information (CSI) measurements in a License Assisted Access (LAA) system, the apparatus comprising one or more processors and memory configured to:
  process, at the UE, information received from a base station in the LAA system, wherein the information is received within a downlink (DL) transmission burst from the base station, wherein the information indicates one of: a cell-specific reference signal (CRS) or channel state information reference signal (CSI-RS) transmission power offset value for the DL transmission burst, one or more subframes in the DL transmission burst for which the UE is to perform CSI measurements, or a subframe boundary of the DL transmission burst; and
  perform a CSI measurement for the DL transmission burst based on the information received from the base station, wherein subframes of the DL transmission burst are associated with a substantially similar transmission power.

20. The apparatus of claim 19, further comprising radio frequency (RF) circuitry to receive the information from the eNodeB, wherein the information is received from the eNodeB using one of: downlink control information (DCI), a Physical Control Format Indicator Channel (PCFICH) or a CRS, wherein the information enables the UE to distinguish subframes with different transmission powers when performing CSI measurements.

21. The apparatus of claim 19, further comprising radio frequency (RF) circuitry to receive the information from the eNodeB, wherein the information enables the UE to distinguish subframes with different transmission powers when performing CSI measurements, wherein the information is received from the eNodeB using one of:
  downlink control information (DCI), wherein the DCI has a length that corresponds to DCI format 1C, wherein the DCI includes an LAA radio network temporary identifier (RNTI), wherein a search space of the DCI is a common search space or a UE-group search space;
  a Physical Control Format Indicator Channel (PCFICH), wherein a size of a physical downlink control channel (PDCCH) is fixed; or
  a modified CRS that includes indication information included for CRS generation, wherein the modified CRS uses additional phase modulation to carry 1 bit information.

22. The apparatus of claim 19, wherein the UE includes at least one of an antenna, a touch sensitive display screen, a speaker, a microphone, a graphics processor, an application processor, a baseband processor, an internal memory, a non-volatile memory port, and combinations thereof.

* * * * *